Jan. 27, 1959 E. L. CLINE 2,870,875
HYDRO-KINETIC BRAKE DEVICE
Filed Oct. 12, 1951 15 Sheets-Sheet 2
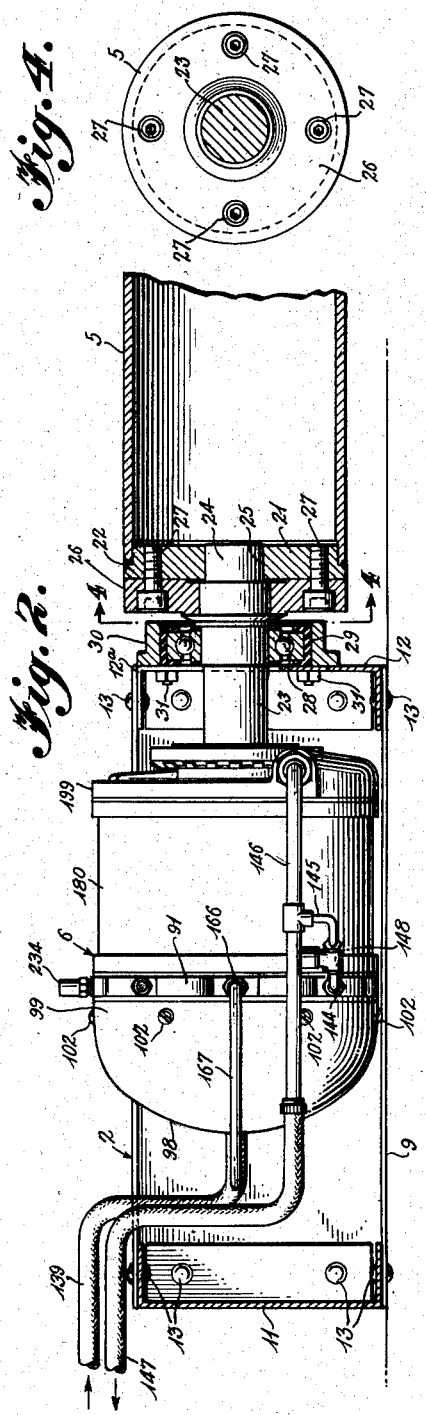
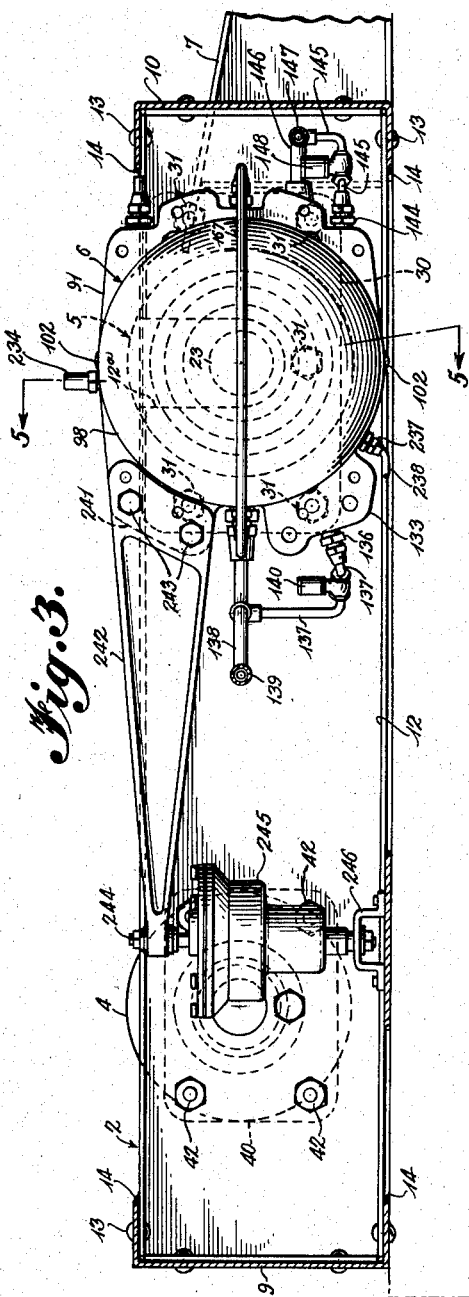
INVENTOR
*Edwin L. Cline*
BY *Bacon + Thomas*
ATTORNEYS

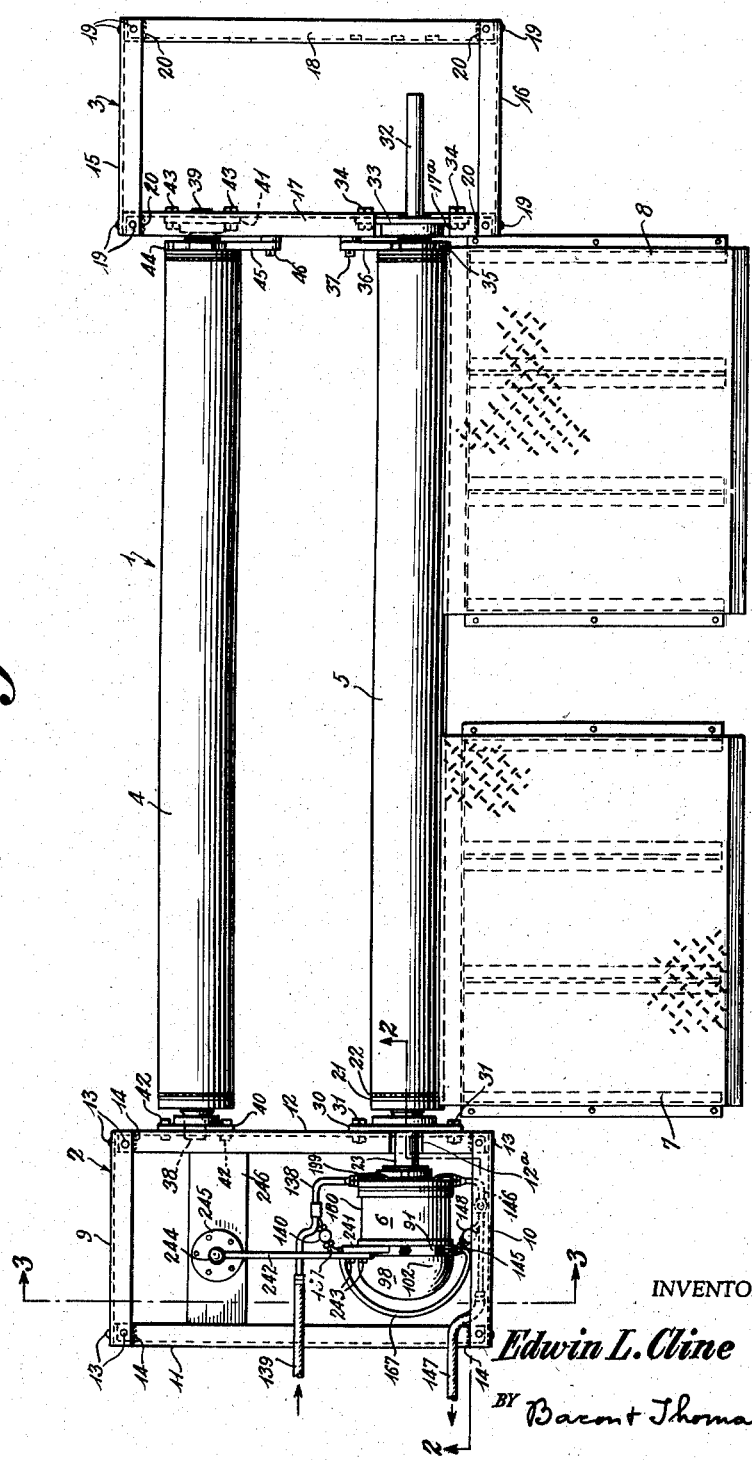

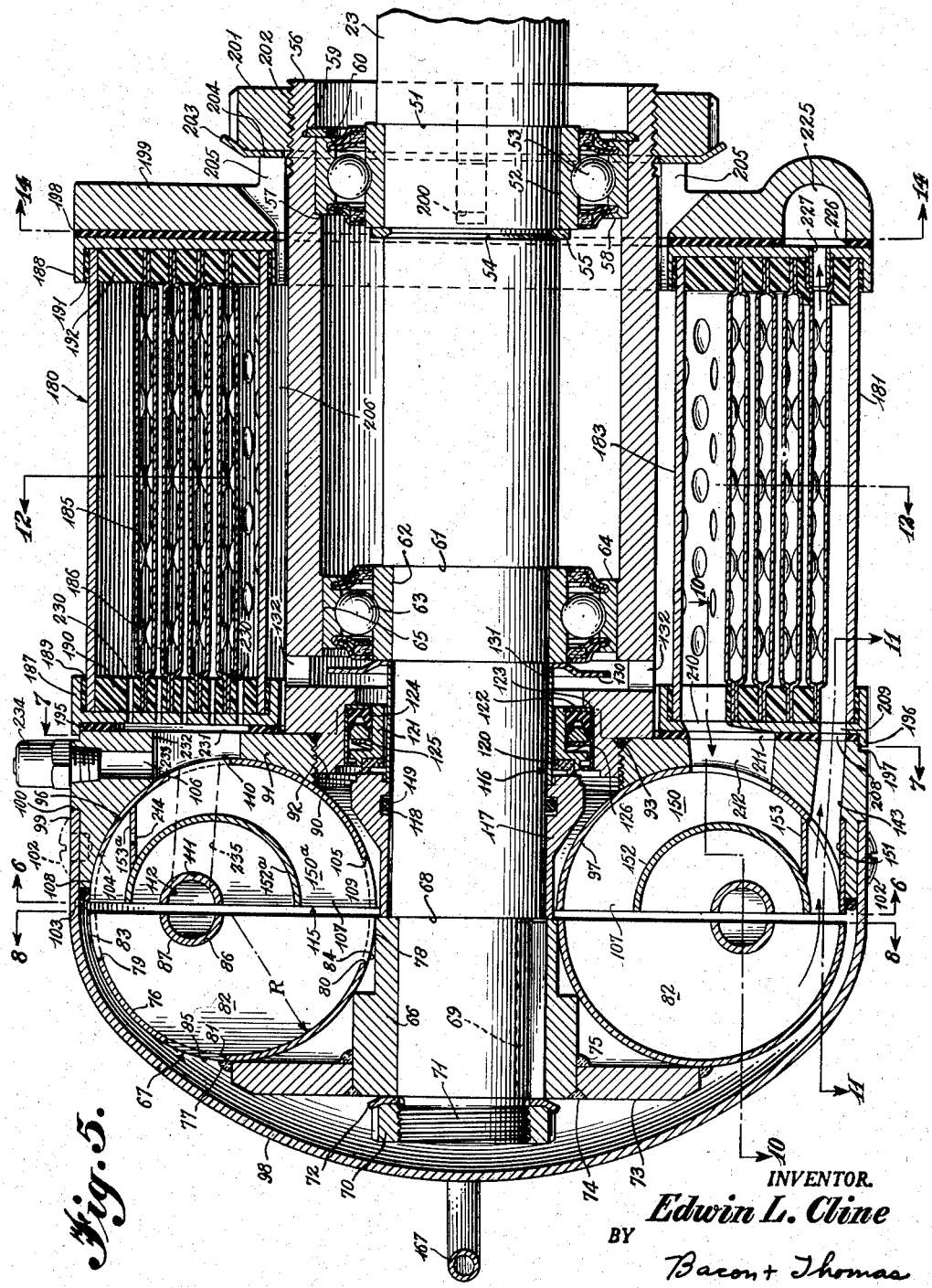

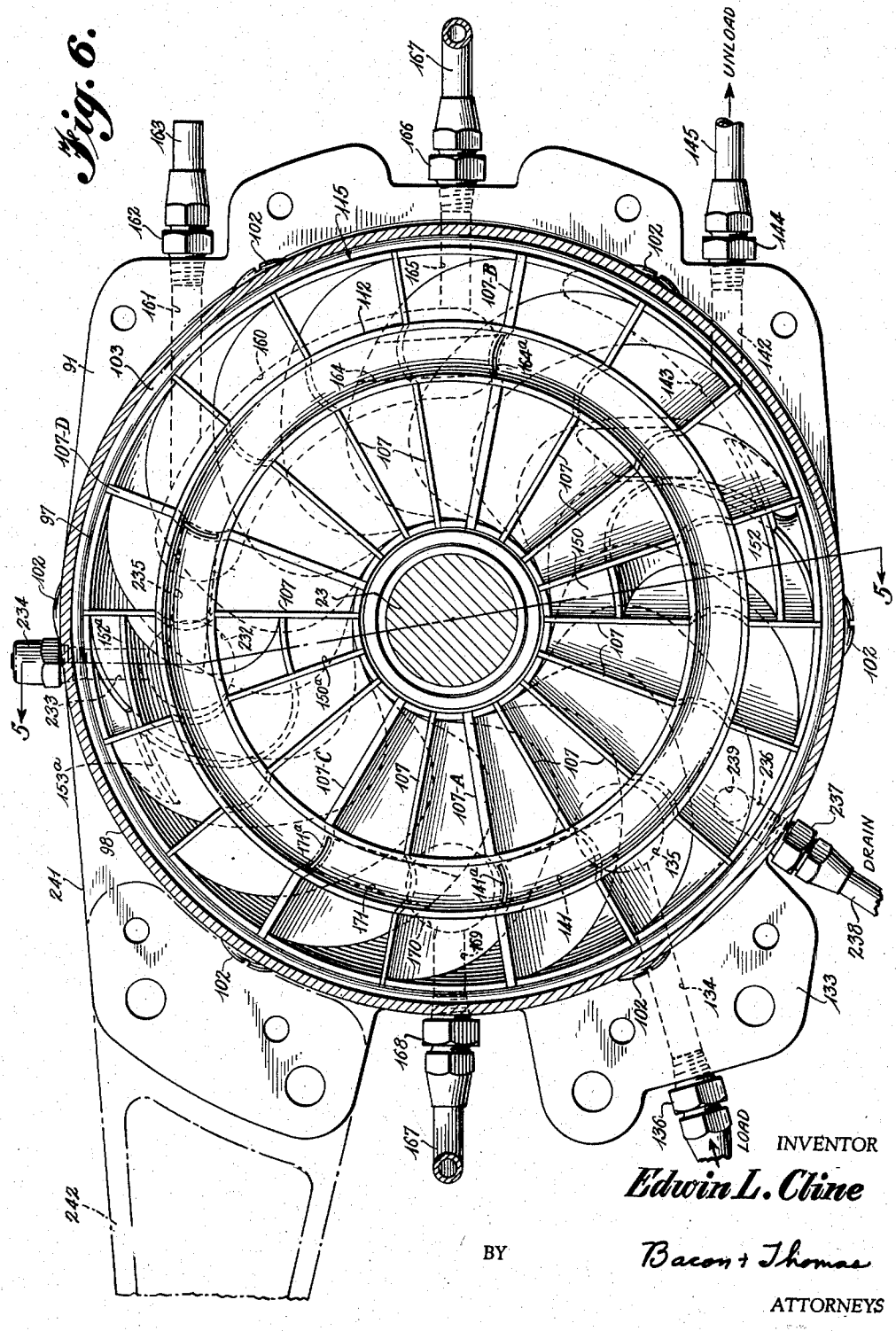

Jan. 27, 1959　　　　　E. L. CLINE　　　　　2,870,875
HYDRO-KINETIC BRAKE DEVICE
Filed Oct. 12, 1951　　　　　　　　　　　　15 Sheets-Sheet 6
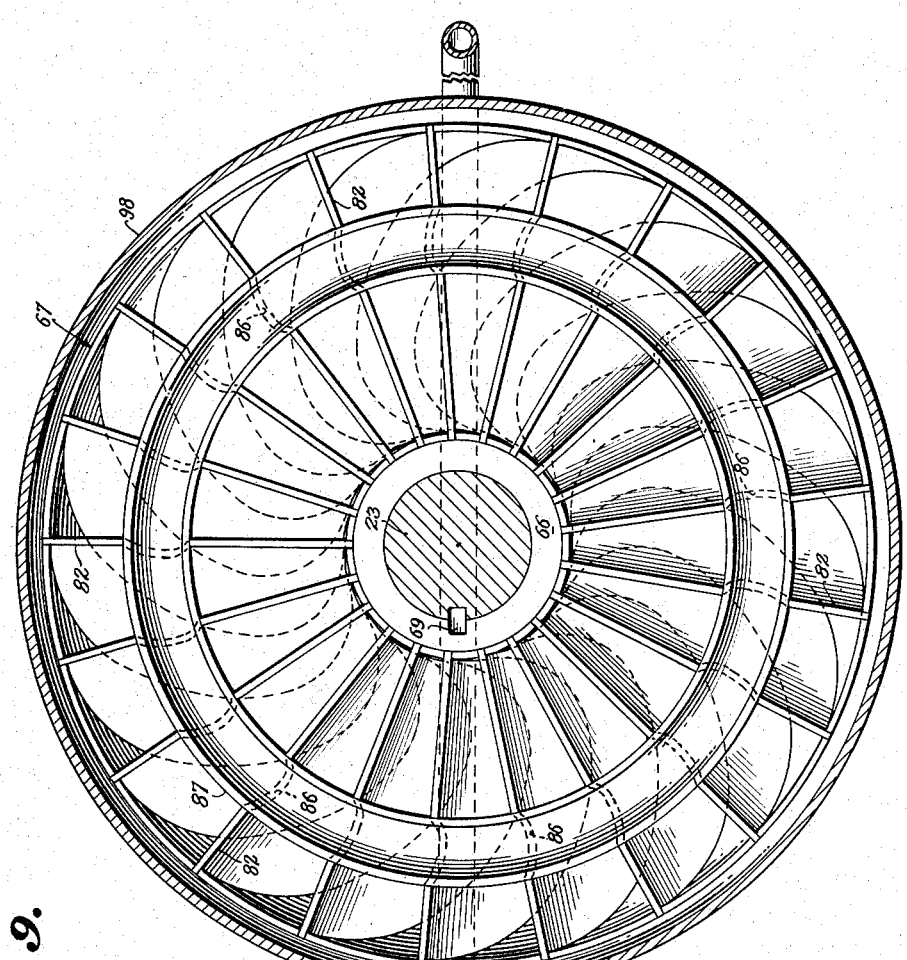
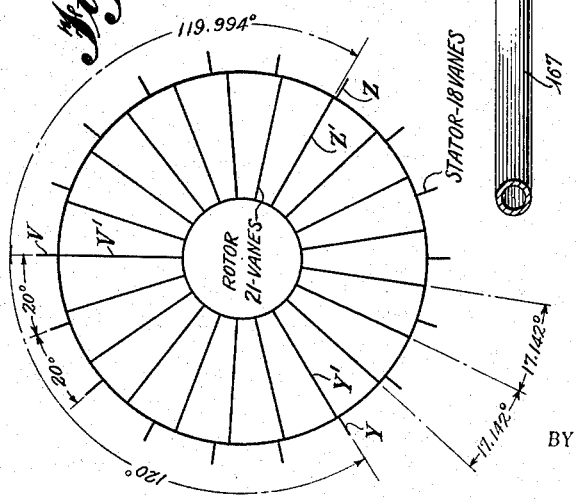
INVENTOR
*Edwin L. Cline*
BY *Bacon + Thomas*
ATTORNEYS

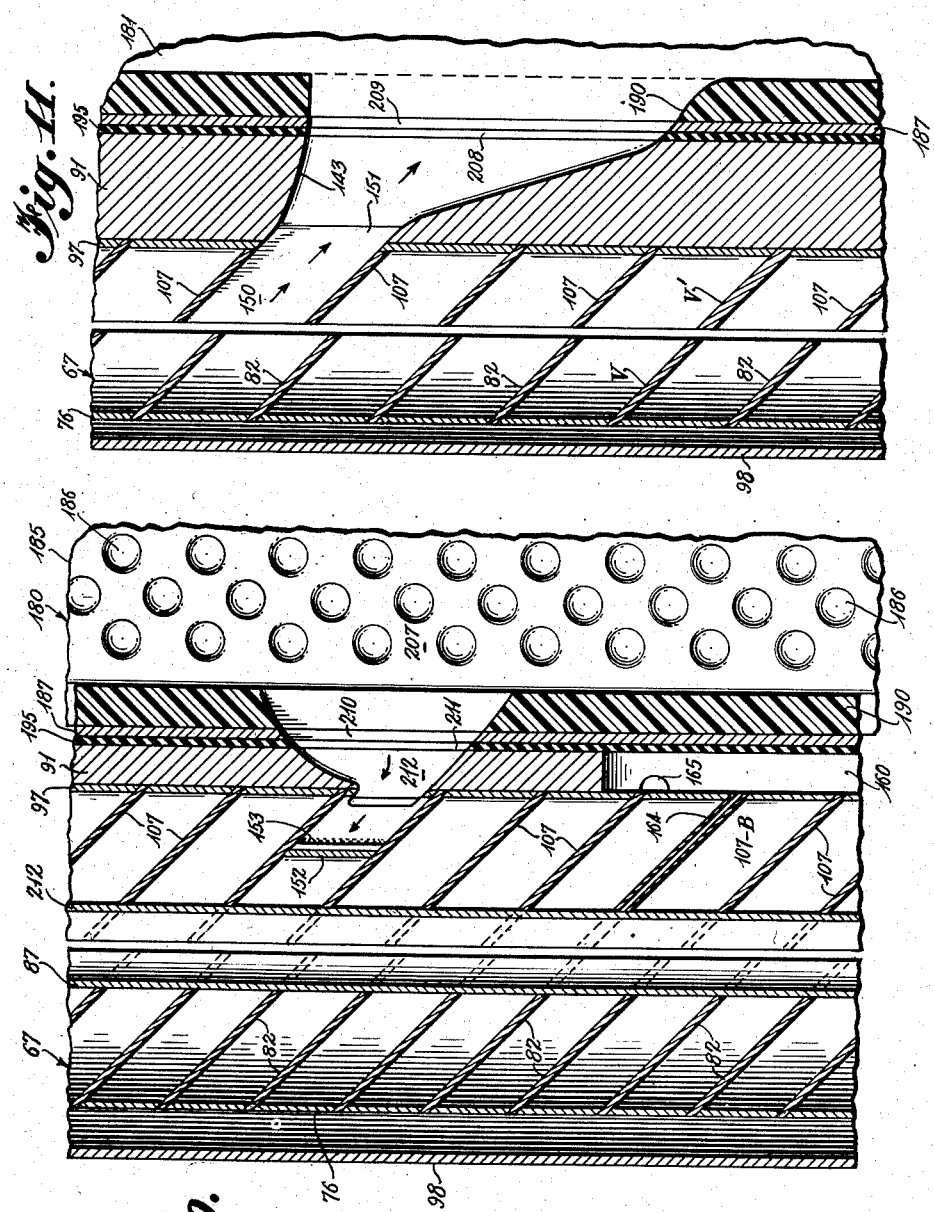

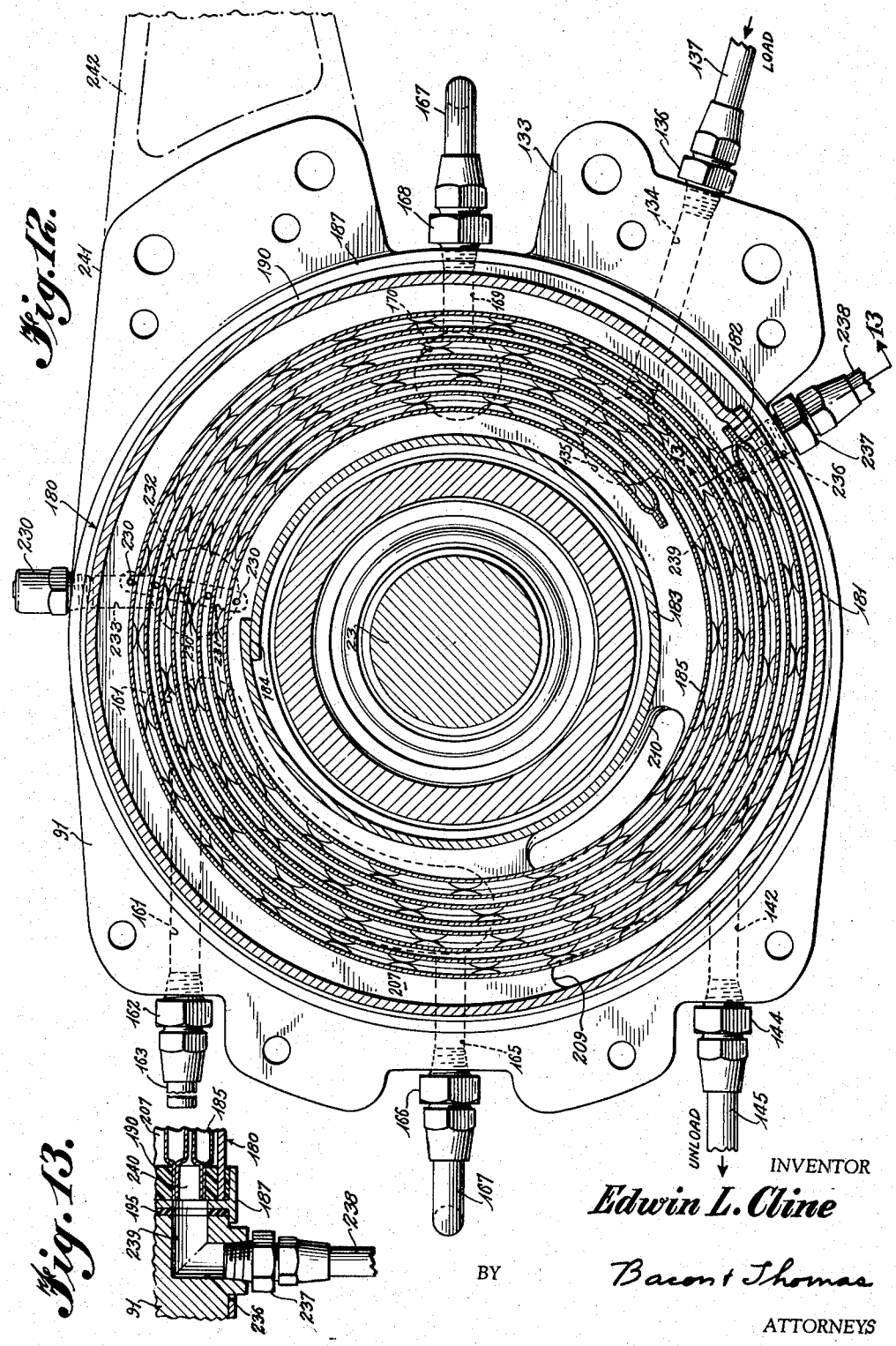

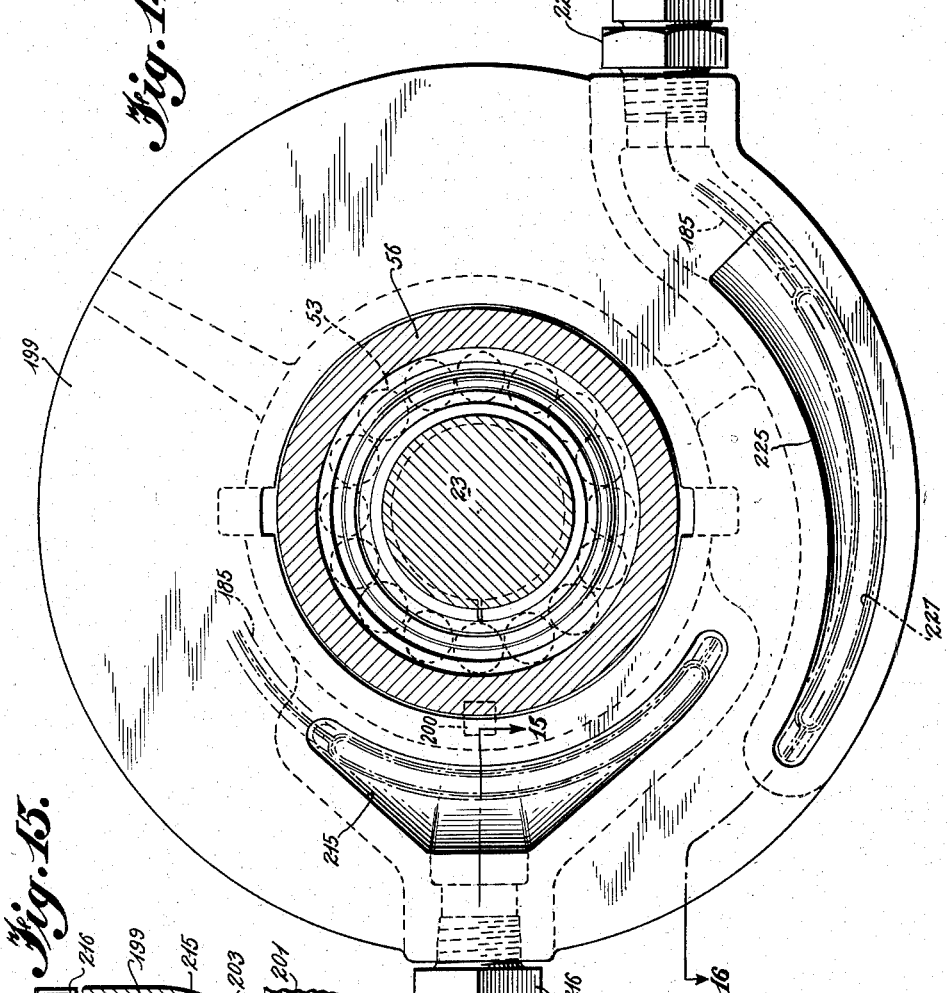

Jan. 27, 1959     E. L. CLINE     2,870,875
HYDRO-KINETIC BRAKE DEVICE
Filed Oct. 12, 1951     15 Sheets-Sheet 10
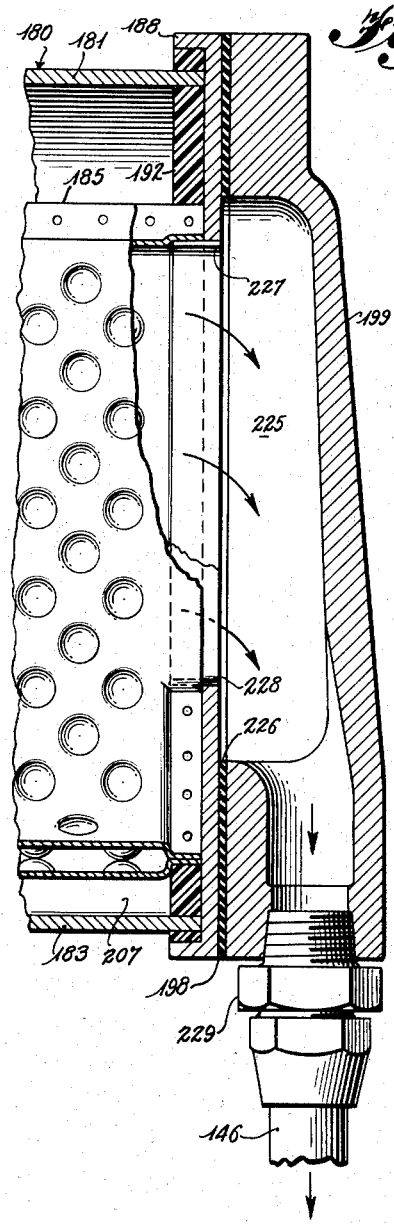
Fig. 16.
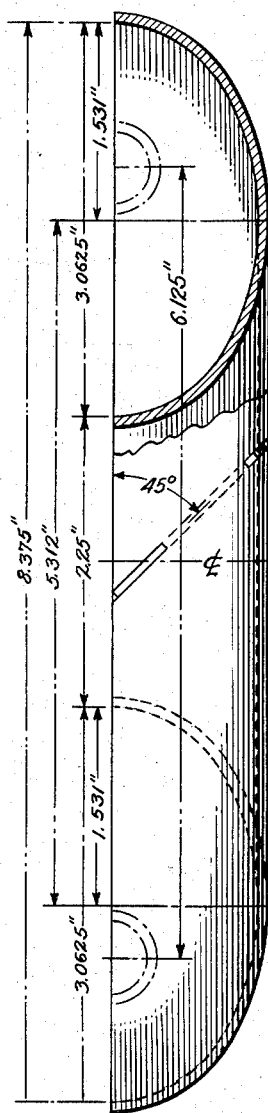
Fig. 20.
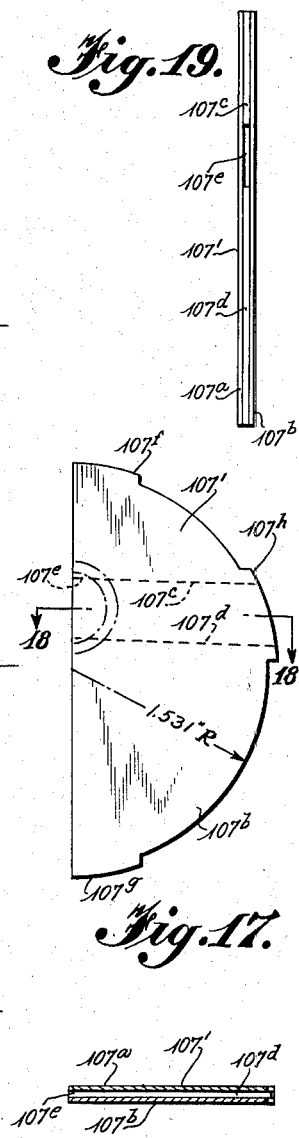
Fig. 19.
Fig. 17.
Fig. 18.
INVENTOR.
Edwin L. Cline
BY
Bacon & Thomas
ATTORNEYS

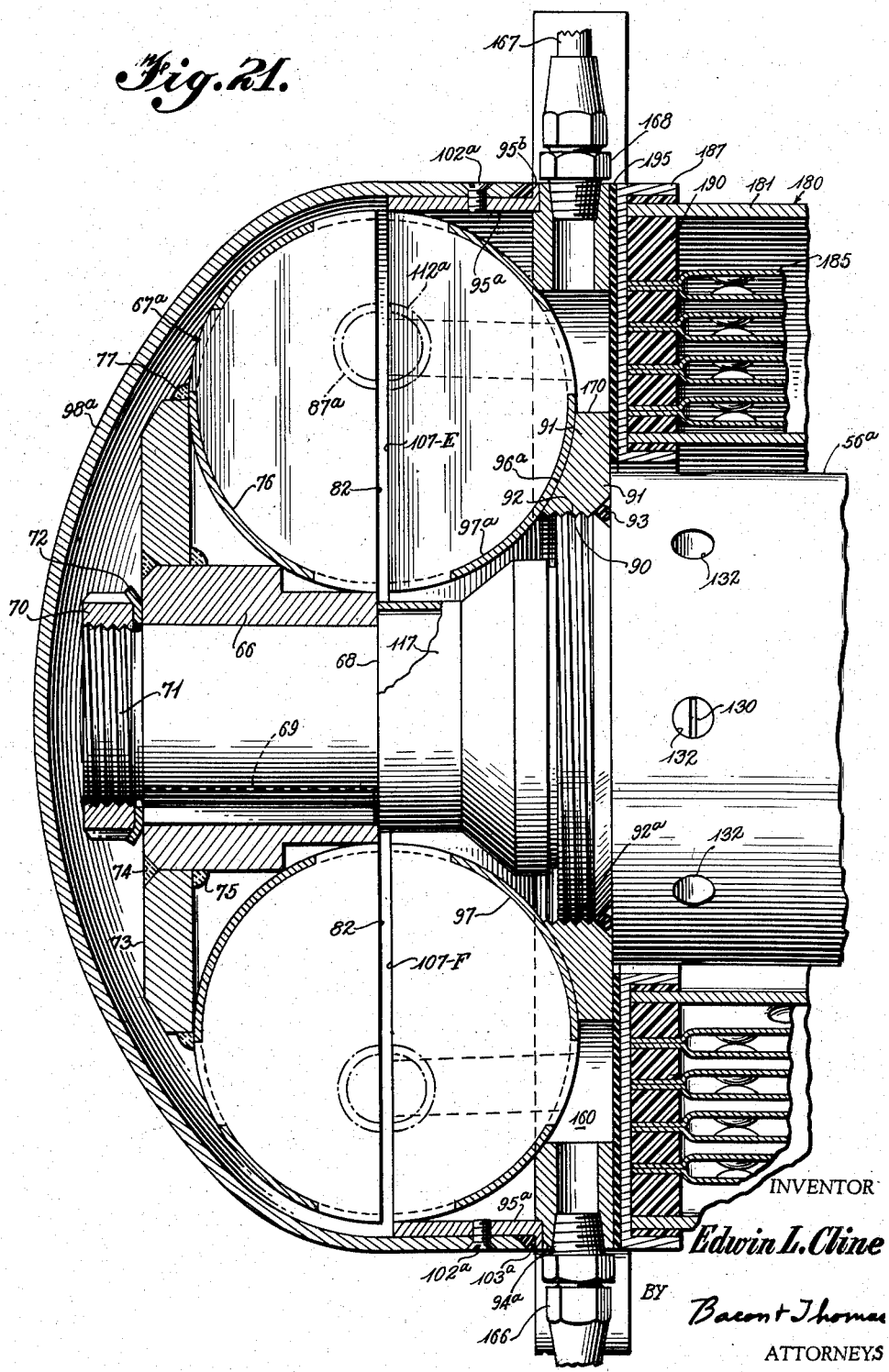

Jan. 27, 1959 E. L. CLINE 2,870,875
HYDRO-KINETIC BRAKE DEVICE
Filed Oct. 12, 1951 15 Sheets-Sheet 12
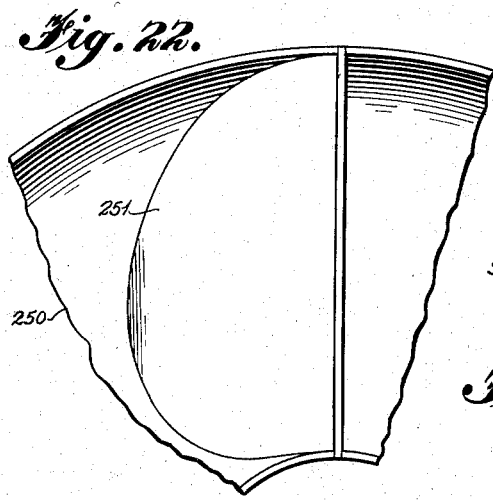
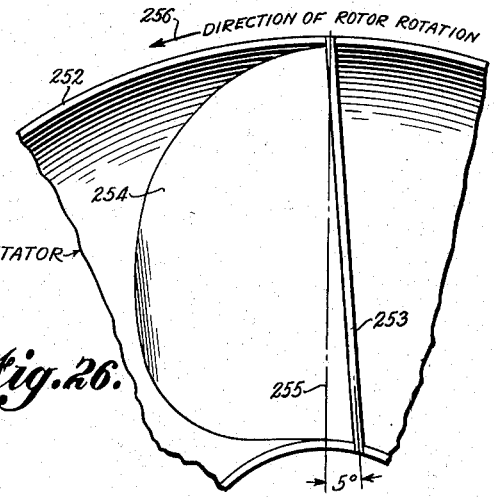
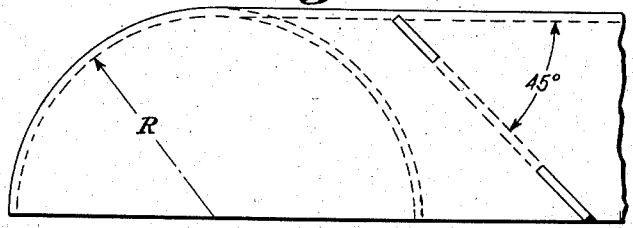
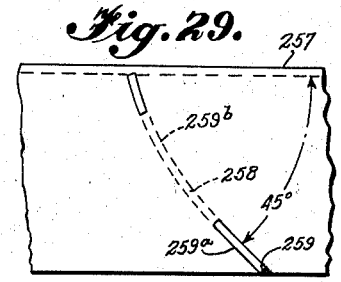
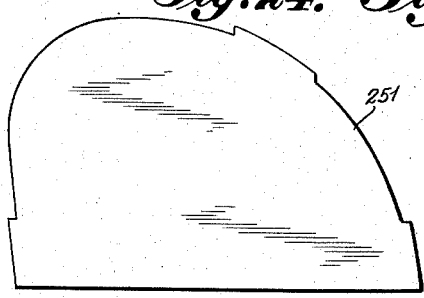 
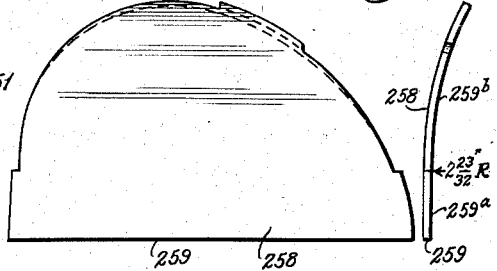 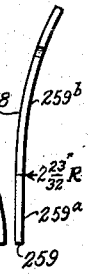
 
INVENTOR
Edwin L. Cline
BY
Baron + Thomas
ATTORNEYS Jan. 27, 1959

E. L. CLINE 2,870,875

HYDRO-KINETIC BRAKE DEVICE

Filed Oct. 12, 1951

INVENTOR
Edwin L. Cline

BY
Bacon + Thomas
ATTORNEYS

Jan. 27, 1959 E. L. CLINE 2,870,875
HYDRO-KINETIC BRAKE DEVICE
Filed Oct. 12, 1951 15 Sheets-Sheet 14

45° SEMI-CIRCULAR VANES ON ROTOR AND STATOR

45° VANES. SEMI-CIRCULAR VANE ON STATOR. ROTOR SEMI-CIRCULAR ON SAME RADIUS AS VANE OF STATOR

45° VANES. ROTOR AND STATOR SEMI-CIRCULAR IN CROSS-SECTION

INVENTOR
Edwin L. Cline
BY Bacon + Thomas
ATTORNEYS

Jan. 27, 1959

E. L. CLINE 2,870,875

HYDRO-KINETIC BRAKE DEVICE

Filed Oct. 12, 1951

INVENTOR

Edwin L. Cline

BY

Bacon + Thomas

ATTORNEYS

United States Patent Office 2,870,875
Patented Jan. 27, 1959

2,870,875
HYDRO-KINETIC BRAKE DEVICE

Edwin L. Cline, Altadena, Calif., assignor to Clayton Manufacturing Company, El Monte, Calif.

Application October 12, 1951, Serial No. 251,095

43 Claims. (Cl. 188—90)

The present invention relates to hydro-kinetic devices and in particular to rotary hydro-kinetic brake or power absorption devices having general utility as a hydraulic brake unit or hydraulic dynamometer, and adapted for use in retarding the rotation of any rotating element, or for absorbing the power or torque applied to any rotating element, such as the shaft of a prime mover or any member driven from such shaft.

The principal object of the invention is to provide a hydro-kinetic brake unit which is of greatly reduced or "junior" size compared with all known prior units, but which will, notwithstanding, provide a much greater braking effect or power absorption capacity than much larger units.

Another important object of the invention is to provide a practical hydro-kinetic brake unit of such small size as to adapt the same for installation in any environment where limited space is a critical factor, and to extend the use of hydro-kinetic brake equipment to fields heretofore restricted because of the large size of such equipment.

Another object of the invention is to provide a rotary hydraulic brake or power absorption unit having a very low construction cost per unit horsepower capacity.

Another object of the invention is to provide a hydraulic brake unit that can be fabricated largely from cold or hot rolled bars, plates and sheet metal stampings, thereby eliminating the necessity for making complex castings and performing costly machining operations.

A further object of the invention is to provide a novel rotor and stator construction in which the stator and rotor elements preferably comprise identical sheet metal stampings generally assuming the form of semi-toroidal shells each adapted to have a predetermined number of stamped sheet metal vanes of prescribed shape disposed therein on a given angle to a plane parallel with and passing through the axis of said shells.

A still further object of the invention is to provide a vaned rotor and stator combination wherein the number and arrangement of vanes in each is such that undesirable turbulence, shock, and harmonic vibrations are substantially eliminated.

Another object of the invention is to provide a rotary hydraulic brake unit adaptable for use as a brake on a vehicle, as a brake for derrick reels, as an engine testing dynamometer, in a chassis dynamometer for testing motor vehicles, etc. In connection with chassis dynamometers the small size of the unit is highly advantageous for the reasons that it makes it possible to eliminate the angularly disposed drive connection, angle bearing mounts, and full length rigid frame previously required in a pit or floor-type chassis dynamometer installation, for example, of the character disclosed in my prior Patent 2,452,550.

Still another object of the invention is to provide a hydraulic brake unit which will meet the long felt need in the art of a power absorption unit that closely approaches in outside diameter the size of the drive and idle rolls used in commercially available chassis by dynamometers.

A specific object of the invention is to provide a chassis dynamometer of low maximum height which is easy to install either on top of a floor or in a shallow pit with the top of the chassis dynamometer substantially flush with the floor.

Still another object of the invention is to provide a hydro-kinetic brake device having built-in liquid and air separation means for automatically bleeding air to the atmosphere from the working circuit of the device without permitting any brake liquid to escape from the working circuit.

A further object of the invention is to provide a small hydro-kinetic brake unit adapted to have a compact and highly efficient heat exchanger co-axially associated therewith to provide a closed circulating system for cooling the brake liquid.

A still further object of the invention is to provide a heat exchanger for use with a "junior" hydraulic brake unit that is highly efficient and which can be readily removed and replaced if occasion requires.

Other objects and features of the invention will be apparent from the following description taken in conjunction with the accompanying drawings devoting, by way of example and not limitation, to a chassis dynamometer, and in which drawings:

Fig. 1 is a plane view illustrating a hydraulic brake or power absorption unit, embodying the principles of the present invention, associated with a chassis dynamometer adapted for use in automotive maintenance work;

Fig. 2 is an enlarged fragmentary sectional view taken on the line 2—2 of Fig. 1, particularly illustrating the manner in which the shaft of the hydraulic brake unit is directly connected with one end of a driven dynamometer roll so that the weight of the unit is supported solely by said shaft;

Fig. 3 is an enlarged sectional view taken on the line 3—3 of Fig. 1, and illustrating the hydraulic brake unit in left-end elevation;

Fig. 4 is a detail sectional view taken on the line 4—4 of Fig. 2;

Fig. 5 is an enlarged sectional view through the hydraulic brake unit and heat exchanger associated therewith, taken on the lines 5—5 of Figs. 3 and 6;

Fig. 6 is a vertical sectional view taken on the line 6—6 of Fig. 5 and showing the stator of the brake unit in elevation;

Fig. 8 is a vertical sectional view taken on the line 8—8 of Fig. 5 showing the rotor in elevation;

Fig. 9 is a schematic view illustrating the relative positions of the stator and rotor vanes of the brake unit shown in Fig. 5 wherein the stator has eighteen (18) vanes and the rotor has twenty-one (21) vanes;

Fig. 10 is a fragmentary sectional view taken on the line 10—10 of Figs. 5 and 7 diagrammatically illustrating the relationship between the return portion of a pumping pocket in the stator and the brake liquid discharge port of the heat exchanger;

Fig. 11 is a fragmentary sectional view taken on the line 11—11 of Figs. 5 and 7 diagrammatically illustrating the relationship between the discharge portion of the pumping pocket in the stator and the brake liquid inlet port of the heat exchanger;

Fig. 12 is a vertical sectional view through the heat exchanger taken on the line 12—12 of Fig. 5;

Fig. 13 is a fragmentary sectional view through a drain for the heat exchanger taken on the line 13—13 of Fig. 12;

Fig. 14 is a vertical sectional view taken on the line 14—14 of Fig. 5 particularly illustrating the inlet and outlet ports for the cooling liquid of the heat exchanger formed in a detachable header or end plate;

Fig. 15 is a sectional view taken on the line 15—15 of Fig. 14 illustrating the details of the connection between the cooling water inlet port and the heat exchange element;

Fig. 16 is a sectional view taken on the line 16—16 of Fig. 14 illustrating the details of the connection between the coolant outlet port and the heat exchange element;

Fig. 17 is a side view of a typical hollow vane adapted for use in a stator as either an air-bleed vane or a brake liquid inlet or loading vane;

Fig. 18 is a horizontal sectional view taken on the line 18—18 of Fig. 17;

Fig. 19 is an end elevational view of the vane shown in Fig. 17;

Fig. 20 is a somewhat diagrammatic view of a typical torous shell, with principal dimensions noted, adapted for use either as a rotor or stator element and which is non-semicircular in cross-section to receive a truly semi-circular vane therein mounted on an angle of 45° to the rotor axis;

Fig. 21 is a vertical sectional view through a modified form of hydraulic brake unit;

Figs. 22 and 23 illustrate a torous truly semi-circular in cross-section having a flat vane of appropriate contour disposed therein with its inner edge radial to the axis of the torus and with the body portion of the vane disposed on an angle of 45° to a plane parallel with and passing through the axis of the torus;

Figs. 24 and 25 are elevational and edge views, respectively, of the vane shown in Figs. 22 and 23;

Figs. 26 to 28 illustrate a similar vane in a stator shell but with the inner edge of the vane inclined rearwardly relative to the direction of rotation of the rotor on an angle of 5° to a true radius;

Figure 32:
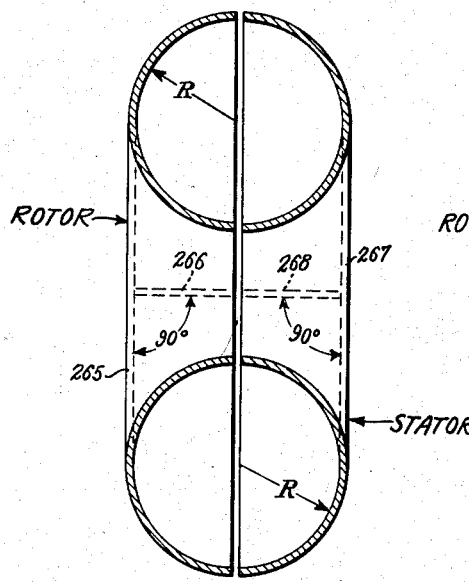
Figure 33:
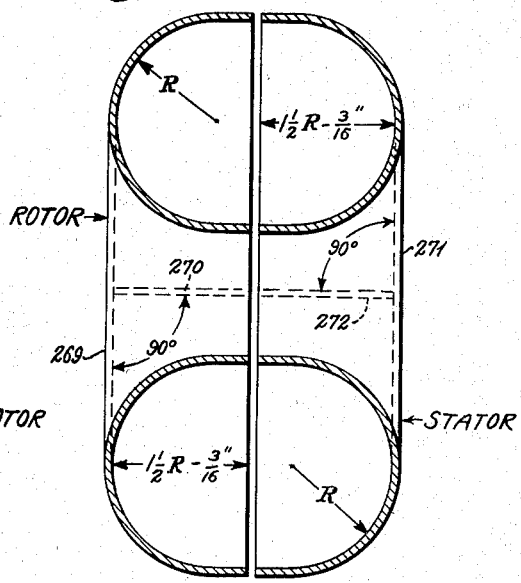
Figure 34:
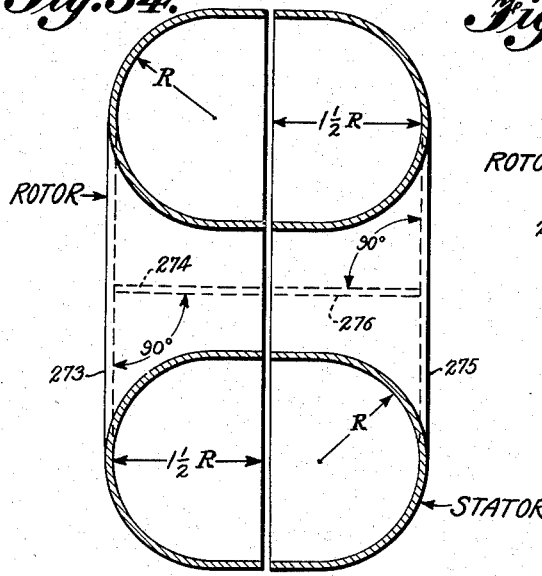
Figure 35:
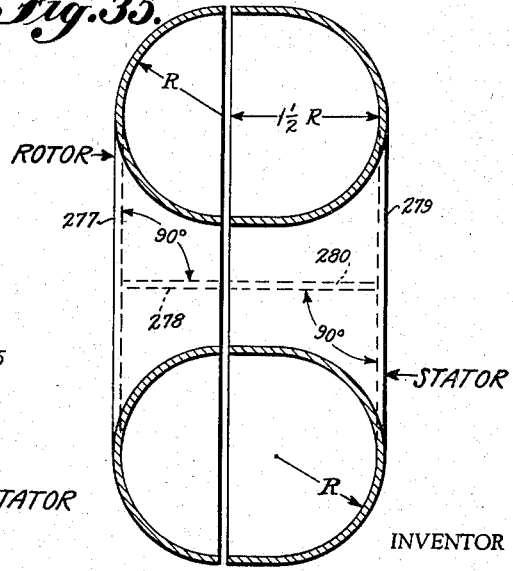
Figure 36:
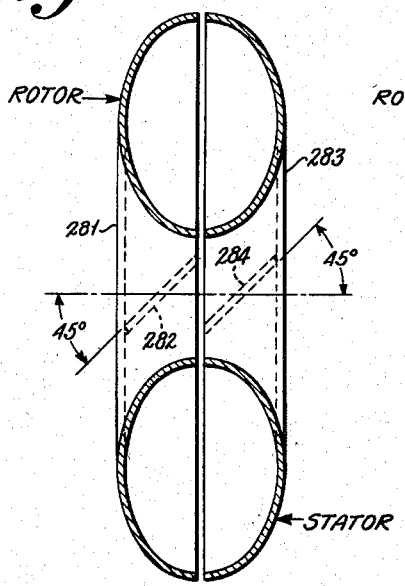
Figure 37:
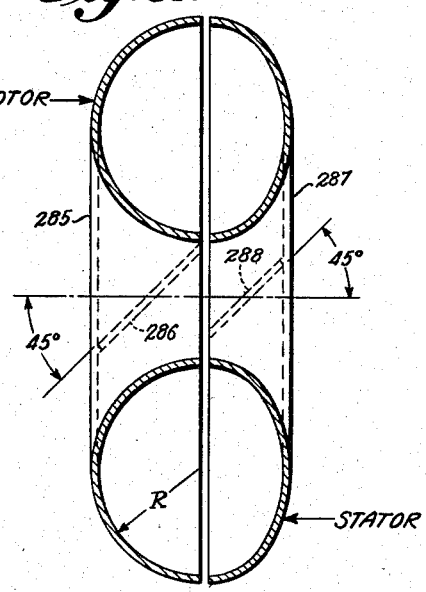
Figure 38:
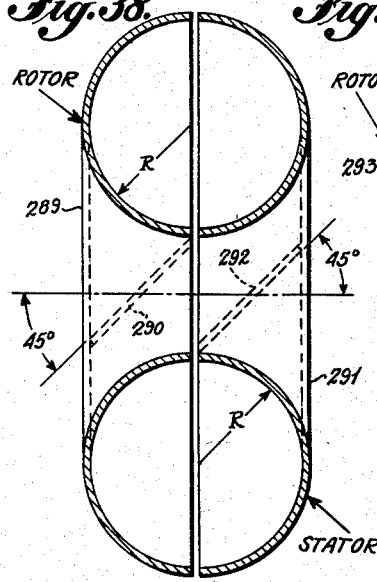
Figure 39:
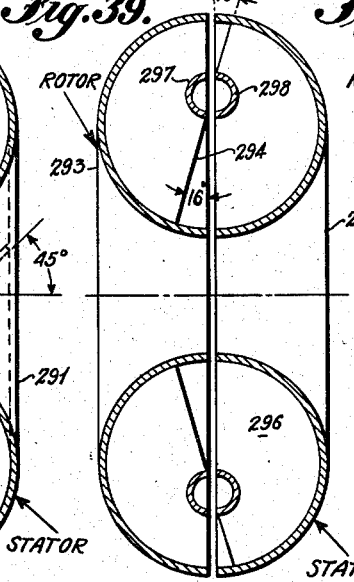
Figure 40:
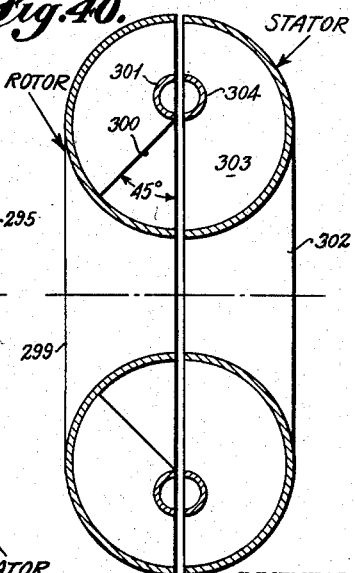
Figure 41:
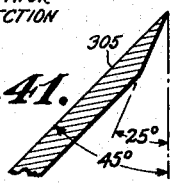
Figure 42:
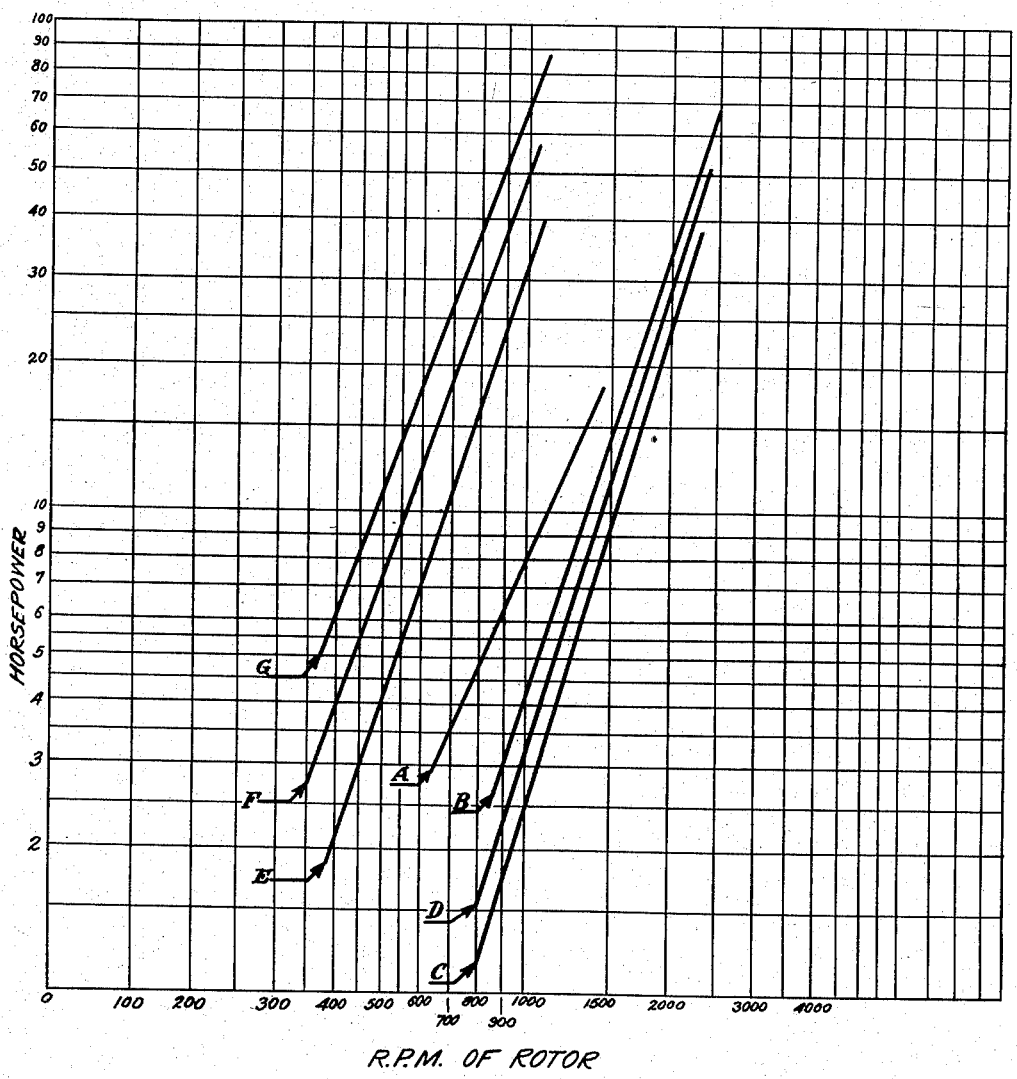

Figs. 29 to 31 illustrate a vane arrangement similar to that shown in Figs. 22 to 25, but wherein the inner portion of the body of the vane is arcuate or curved, Fig. 32 is a diagrammatic view illustrating rotor and stator shells in which 90° vanes are radially disposed and lie in a plane parallel with and passing through the axis of the rotor shaft, the shells each being substantially semi-circular in cross-section;

Fig. 33 is a diagrammatic view of rotor and stator shells including semi-circular portions in which 90° vanes are arranged radially, but wherein the axial dimension of the shells and the vanes is one and one-half times the radius of the shells minus 3/16 inch;

Fig. 34 is a similar diagrammatic view of rotor and stator shells including semi-circular portions in which 90° vanes are arranged radially, but wherein the axial dimension of the shells and vanes is one and one-half times the radius of the shells;

Fig. 35 diagrammatically illustrates a rotor having 90° radial vanes arranged therein which are truly semi-circular and a stator in which the axial dimension of the vanes is equal to one and one-half times the radius of the stator;

Fig. 36 is a diagrammatic view illustrating rotor and stator shells in which the vanes are truly semi-circular in contour and are disposed on an angle of 45° to a plane parallel with and passing through the axis of the shells;

Fig. 37 is a diagrammatic view illustrating a rotor shell having a truly semi-circular cross-section with vanes disposed therein on an angle of 45° to the axis thereof and a stator shell having truly semi-circular vanes similarly disposed therein on an angle of 45°;

Fig. 38 is a diagrammatic view of rotor and stator shells each of which is truly semi-circular in cross-section and each has vanes disposed on an angle of 45° to the axis thereof;

Fig. 39 diagrammatically illustrates rotor and stator shells which are truly semi-circular in cross-section and wherein the vanes may be disposed either radially and parallel with the axis of the shells as in Fig. 32 or on an angle of 45° to such axis as in Fig. 38, each of the shells having a vortex control ring mounted therein, with the vanes on the rotor clipped or cut back on an angle of about 16° from the inner margin of the vortex control ring toward the inner margin of the rotor shell;

Fig. 40 is a view similar to Fig. 39 in which the rotor vanes are cut back on an angle of 45° from the vortex control ring;

Fig. 41 is an enlarged detail view of one of the 45° vanes, illustrating the manner in which the edge of the vane may be beveled to increase its efficiency; and Fig. 42 is a graph representing the comparative performance of dynamometers having rotors and stators of the character shown in Figs. 32 to 38, inclusive.

Referring now to Fig. 1 of the drawings, the chassis dynamometer is identified by the numeral 1 and includes frame assemblies generally identified by the numerals 2 and 3, hollow dynamometer idle and drive rolls 4 and 5, respectively, a hydraulic brake unit 6, embodying the principles of the present invention and directly connected to the drive roll 5, and a pair of ramp members 7 and 8, of any suitable or conventional construction for aiding in backing a vehicle onto the rolls 4 and 5 for test purposes.

The frame assembly 2 comprises longitudinally extending channel members 9 and 10 and transverse channel members 11 and 12 having flanged ends received in the channel members 9 and 10, the several channels being secured together by rivets 13 and being welded as indicated at 14 to render the frame assembly more rigid.

The frame assembly 3 is generally similar to the frame assembly 2 and includes longitudinally extending channel members 15 and 16 and transverse channel members 17 and 18, the several channel members being secured together by rivets 19 and being welded as indicated at 20.

The drive roll 5 is dynamically balanced and has a closure plate 21 (Fig. 2) mounted in one end thereof and permanently secured thereto by welding as indicated at 22. The brake unit 6 includes a brake or stub shaft 23 having a reduced end portion 24 received in an axially aligned opening 25 formed in the closure plate 21.

A flange 26 is carried by the shaft 23 adjacent the pilot end 24 thereof and is secured to the closure plate 21 by a plurality of countersunk cap screws 27. A conventional ball-bearing 28 has its inner race mounted on the shaft 23 adjacent the flange 26 and between the back of the channel member 12 and the flange 26. The channel member 12 has a portion of its upper flange and a portion of its back cut away, as indicated at 12a in Figs. 1 and 2, to facilitate assembly of the roll 5 and brake unit with the frame 2. To this end, the outer race of the ball-bearing 28 is received in an annular rubber grommet 29 which is U-shaped in cross-section (see Fig. 2) and disposed in a bearing housing 30 secured to the back of the channel member 12 by a plurality of bolts 31, as best shown in Figs. 1 and 3.

The other end of the drive roll 5 has a shaft 32 similarly secured thereto and the channel member 17 has a portion of its upper flange and back cut away as indicated at 17a in Fig. 1. The shaft 32 is mounted in a bearing 33 similar to the bracket 30 and is secured to the back of the channel member 17 by bolts 34. The portion of the shaft 32 corresponding to the flange 26 on the shaft 23 is preferably provided with teeth at its periphery adapted to form a ratchet 35. A pawl 36 is mounted upon a pin 37 carried by the channel member 17 and is adapted to engage the ratchet 35 to prevent rotation of the roll 5 in one direction to facilitate driving a vehicle off the rolls 4 and 5. The shaft 32 is extended beyond the channel member 17 to receive means for drivingly interconnecting the same with a flywheel (not shown).

The idle roll 4 is also dynamically balanced and has stub shafts 38 and 39 mounted in the ends thereof in a manner similar to the mounting for the shafts 23 and 32. The shafts 38 and 39 are likewise mounted in ball-bearings, similar to the ball-bearing 28 disposed in brackets 40 and 41, respectively, secured by bolts 42 and 43 to their associated channel members 12 and 17. A portion of the stub shaft 39 is toothed to provide a ratchet 44 adapted to be engaged by a pawl 45 to prevent rotation of the roll 4 in one direction. The pawl 45 is mounted upon a pin 46 carried by the channel member 17. The pawl 45 is engageable with the ratchet 44 to prevent rotation of the roll 4 at such time as the ramps 7 and 8 are disposed adjacent the idle roll 4, instead of the drive roll 5, to permit driving of a vehicle off said rolls. It will be understood that 2 sets of ramps may be provided, one set for each roll 4 and 5, but usually one set will suffice since it is a simple matter to shift the ramps from one roll to the other, as required.

It will be understood from the foregoing that the assembled rolls 4 and 5 are carefully dynamically balanced, and are supported at their opposite ends in the frame assemblies 2 and 3 by ball-bearings all mounted in rubber grommets so that noise and vibration are reduced to a minimum. It will also be understood that the frame assemblies 2 and 3 simplify installation and can be secured to any desired area of a garage floor or pit by bolts (not shown). If the installation is such that the ramps 7 and 8 will be permanently disposed adjacent the drive roll 5, then said ramps likewise can be secured to the garage floor by any suitable means.

As has been previously stated, the brake shaft 23 of the hydraulic brake unit 6 is directly connected with the drive roll 5. The hydraulic brake unit 6 is shown in longitudinal cross-section in Fig. 5 to which reference will now be made. The shaft 23 has a shoulder 51 engaged by the inner race 52 of a conventional ball-bearing 53, and a groove 54 which receives a split snap ring 55 for locking the inner race 52 in position on the shaft 23. An elongated stator mounting sleeve 56 is disposed concentric with the shaft 23 and is provided with an internal shoulder 57 engaged by the outer race 58 of the ball-bearing 53, and a groove 59 adapted to receive a conventional snap ring 60 for locking the outer race 58 in assembled relation with the sleeve 56.

The shaft 23 has another shoulder 61 and the inner race 62 of another conventional ball-bearing 63 is mounted upon said shaft adjacent said shoulder. The outer race 64 of the ball-bearings 63 is engaged with the inner periphery of an annular pad 65 formed on the interior of the stator mounting sleeve 56. Thus, it will be seen that the sleeve 56 is longitudinally fixed only relative to the ball-bearing 53 and is supported for free relative rotary movement with respect to the shaft 23 by the two ball-bearings 53 and 63.

The end of the shaft 23 remote from the drive roll 5 is reduced in diameter to receive thereon the hub portion 66 of a rotor assembly 67. The inner end of the hub 66 engages still another shoulder 68 on the shaft 23 spaced a predetermined distance from the shoulder 51, and a key 69 secures the rotor assembly 67 in non-rotatable relation to the shaft 23. A nut 70 is mounted upon a threaded portion 71 of the shaft 23 and prevents longitudinal movement of the rotor assembly 67 relative to the shaft 23. A lock washer 72 holds the nut 70 against inadvertently loosening.

The rotor hub 66 is made from cold rolled steel and has a circular steel flange or plate 73 secured thereto by circumferentially extending welds in the region indicated by the numerals 74 and 75. A sheet metal rotor shell member 76 of hollow semi-toroidal form is secured to the flange 73 by a continuous weld 77 at the outer periphery of said flange. The shell member 76 is preferably fabricated from 14 gauge, type 321 stainless steel, in a hydraulic press and its cross-section follows a true semicircle having an inner radius indicated by the letter "R." Other pertinent dimensions are shown in Fig. 20 in connection with a modified form of torus discussed more fully hereinafter. The inner periphery of the rotor shell 76 snugly engages with a reduced portion 78 on the hub 66, as best shown in Fig. 5, the inner radial surface of said hub being flush with the inner edge of said shell.

The rotor shell 76 is provided with a series of twenty-one, 1/16 inch wide, notches 79 at its outer margin and an equal number of similar notches 80 at its inner margin, said notches being cut into the edges of said shell on an angle of about 45° to a plane parallel to the shaft 23 and passing through the axis of the shaft. A row of twenty-one, 1/16 inch wide 45°, slots 81 is formed in the rotor shell 76 adjacent the crest of the semi-circular cross-section thereof. These several rows of notches and slots serve as mounting and positioning means for a series of twenty-one stamped, 1/16 inch thick stainless steel vanes 82 carrying marginal tabs 83 and 84 at the opposite ends thereof adapted to be snugly received in the notches 79 and 80, and an intermediate tab 85 adapted to be snugly received in the slots 81. The vanes 82 have the longitudinal straight edges thereof disposed radially and flush with the inner and outer margins of the rotor shell 76, but the body portion thereof is disposed on an angle of about 45° to a plane parallel to the shaft 23 and passing through the axis of said shaft, so that, while the shell 76 is substantially semi-circular in radial cross-section, the body portion of the vanes is necessarily wider than the radius R. This will be clear from Fig. 8 and also from Figs. 22 to 25 referred to in detail hereinafter.

Each of the vanes 82 is optionally provided with a semi-circular recess 86 (Fig. 5) cut in its inner edge for the reception of a core or vortex control ring 87, which is hollow and substantially semi-circular in cross-section. According to the aforesaid operative example of the invention, the vortex control ring 87 has an outside diameter of 11/16 inch and an inside diameter of 1/2 inch with the center line of the ring disposed on a radius of 3 1/16 inches from the axis of the shaft 23.

In fabricating the rotor 67, the vanes 82 are mounted in the shell member 76 with their tabs 83, 84 and 85 disposed in their respective angular notches and slots 79, 80 and 81. The vortex control ring 87 is then positioned in the recesses 86 of the vanes. The parts thus assembled are clamped in place and then secured together in fixed relation by placing the same in a hydrogen brazing furnace to permanently weld the parts together. The tabs 83, 84 and 85 are of a height substantially equal to the thickness of the shell 76 so that their outer faces lie substantially flush with the outer surface of said shell. The hydrogen brazing of the vortex control ring 87 to the vanes 82 adds stiffness thereto and reduces vibration thereof. However, the vortex control ring 87 may be omitted if desired, in which event it becomes unnecessary to form the recesses 86 in the inner edges of the vanes 82. The brazed rotor element is then welded at 77 to the hub plate 73 and the inner end of the hub is machined flush with the inner face of the rotor.

The stator supporting sleeve 56 (Fig. 5) is shouldered to provide a reduced threaded portion 90 at its inner end. A stator housing plate 91 has a circular opening 92 provided with threads for mounting said plate upon the threaded end 90 of the sleeve 56 in tight engagement with the adjacent shoulder. The inner edge of the opening 92 is chamfered and a conventional sealing ring 93 is disposed in the chamfered region to form a liquid-tight joint between the plate 91 and the sleeve 56 when the parts are tightly assembled. The plate 91 has an annular recess 96 formed in one face thereof which is generally concave in cross-section and complemental to the outer contour of a stator shell 97, said recess serving as a seat for said stator shell, which is identical in material, size and shape to the rotor shell 76 although it has fewer vanes as will presently appear.

A sheet metal cover member 98 is dished or made dome-shaped to form a closure for the stator and to enclose the rotor assembly 67. The cover 98 includes a cylindrical marginal portion 99 disposed in tight engagement with a rabbet 100 formed in the outer periphery of the plate 91. The cover 98 is secured to the plate 91 by a plurality of screws 102, a packing ring 103, which is normally circular in transverse cross-section, being disposed between the stator shell 97 and the inner surface of the cover 98, and in engagement with the inner face of the plate 91, to form a fluid-tight seal between the cover and the outer periphery of the stator.

The stator shell 97 is provided at its outer margin with a series of notches 104 and with a corresponding number of notches 105 at its inner margin. A series of slots 106 extends through the stator shell 97 in a region located outwardly of the highest portion of the crest of the shell. The shell 97 is provided with 18 of the notches 104 and 105 and with 18 slots 106, whereby 18 stator vanes can be mounted therein. The notches 104 and 105 and the slots 106 are disposed on an angle of 45° with respect to a plane parallel with and passing through the axis of the shell 97, so that the vanes are disposed upon a corresponding angle with respect to the axis of the shaft 23, the inner edges of the vanes being truly radial, as shown in Fig. 6.

Fourteen of the stator vanes are identified by the numeral 107 and each is provided with marginal tabs 108, 109, and 110 which are received in the notches 104 and 105 and the slots 106, respectively. These vanes are identical to the rotor vanes 82. The stator is also provided with a hollow loading vane 107-A for admitting brake liquid into the unit and three hollow air-bleed vanes 107-B, 107-C and 107-D, the details and functions of which will be described later. The inner edge of each of the stator vanes 107, 107-A, 107-B, 107-C and 107-D may be provided with a recess 111 for the reception of a vortex control ring section 112 similar to the vortex control ring section 87 of the rotor.

The stator assembly is generally identified by the numeral 115 and in fabricating the same, the parts thereof, including the plate 91, shell 97, vanes 107, 107-A, 107-B, 107-C and 107-D and vortex control ring section 112 are manually placed in the relative positions which they are to occupy when assembled and then clamped and placed in a hydrogen brazing furnace to permanently unite the parts in a unitary assembly. After the stator element has thus been assembled, the plate 91 is mounted upon the sleeve 56, as aforedescribed.

The present design of the rotor and stator elements of sheet metal readily lends itself to the final assembly of the vanes and shells by use of the conventional hydrogen brazing process. This method eliminates the rough fillets etc., that would normally be formed by the conventional arc welding processes and provides fairly smooth bonding joints between the torus shells and vanes. Actual tests have shown that the elimination of such rough fillets, even though located only on the lee side of the vanes, results in a substantial increase in the power absorption capacity of the unit because of the decrease in the friction loss in the brake liquid as it travels through its normal circuit. Hence, all parts of the working circuit should be made as smooth as possible. Plating, enameling, or coating the surfaces of the pockets of the rotor and stator with rubber or other materials of low porosity and providing a durable smooth surface, greatly increases the efficiency of the unit.

In order to prevent leakage of liquid along the shaft 23 from the housing formed by the plate 91 and cover 98, a conventional packing assembly 116 is disposed therebetween. This assembly comprises a stainless steel sleeve 117 surrounding the shaft 23 and disposed inwardly of the stator shell 97 and having one end thereof engaged with the hub 66 of the rotor assembly 67. The sleeve 117 is adapted to rotate with the shaft 23 and has a groove 118 formed in its inner surface in which a conventional rubber packing ring 119 is disposed to form a seal around the shaft 23. A stationary carbon ring 120 is engaged with the opposite end of the sleeve 117 and forms a lapped seal therebetween. The carbon ring 120 is supported by a metal ring 121 generally L-shaped in axial cross-section. A sheet metal packing housing 122 is pressed into a counterbore 123 formed in the sleeve 56, and said housing supports a generally U-shaped flexible packing 124 whose legs are engaged by a wedge ring 125, there being a corrugated spring ring 126 disposed between the L-shaped ring 121 and the wedge ring 125, whereby the packing ring 124 is constantly urged into sealing engagement with the housing 122 and the carbon ring 120 is constantly urged into sealing engagement with the end of the sleeve 117. The packing assembly 116 is constructed of materials adapted to form a seal under either wet or dry operating conditions so that no damage thereto can result if the roll 5 and shaft 23 are driven when no water or other brake liquid is present in the stator housing.

A dished flinger ring 130 is disposed adjacent the inner race 62 of the ball-bearing 63 and a thin cylindrical spacer 131 is disposed between the flinger ring 130 and the adjacent end of the sleeve 117. As has been previously stated, one end of the sleeve 117 is engaged with the inner face of the rotor hub 66, so that when the nut 70 is tightened, the inner race 62 of the ball-bearing 63 is maintained in engagement with the shoulder 61 on the shaft 23, and thus prevented from moving axially relative to said shaft.

In the event that any liquid should leak past the packing assembly 116, or between the sleeve 117 and packing ring 119, the rotating flinger ring 130 will prevent the flow thereof to the ball-bearing 63 and, in fact, will throw any liquid which reaches the same outwardly by centrifugal force. In this connection, the sleeve 56 is provided with a plurality of drain holes 132 disposed radially outwardly of the periphery of the flinger ring 131 and adapted to permit any liquid thrown by the ring 131 to pass therethrough to the exterior of the sleeve 56.

Figure 7:
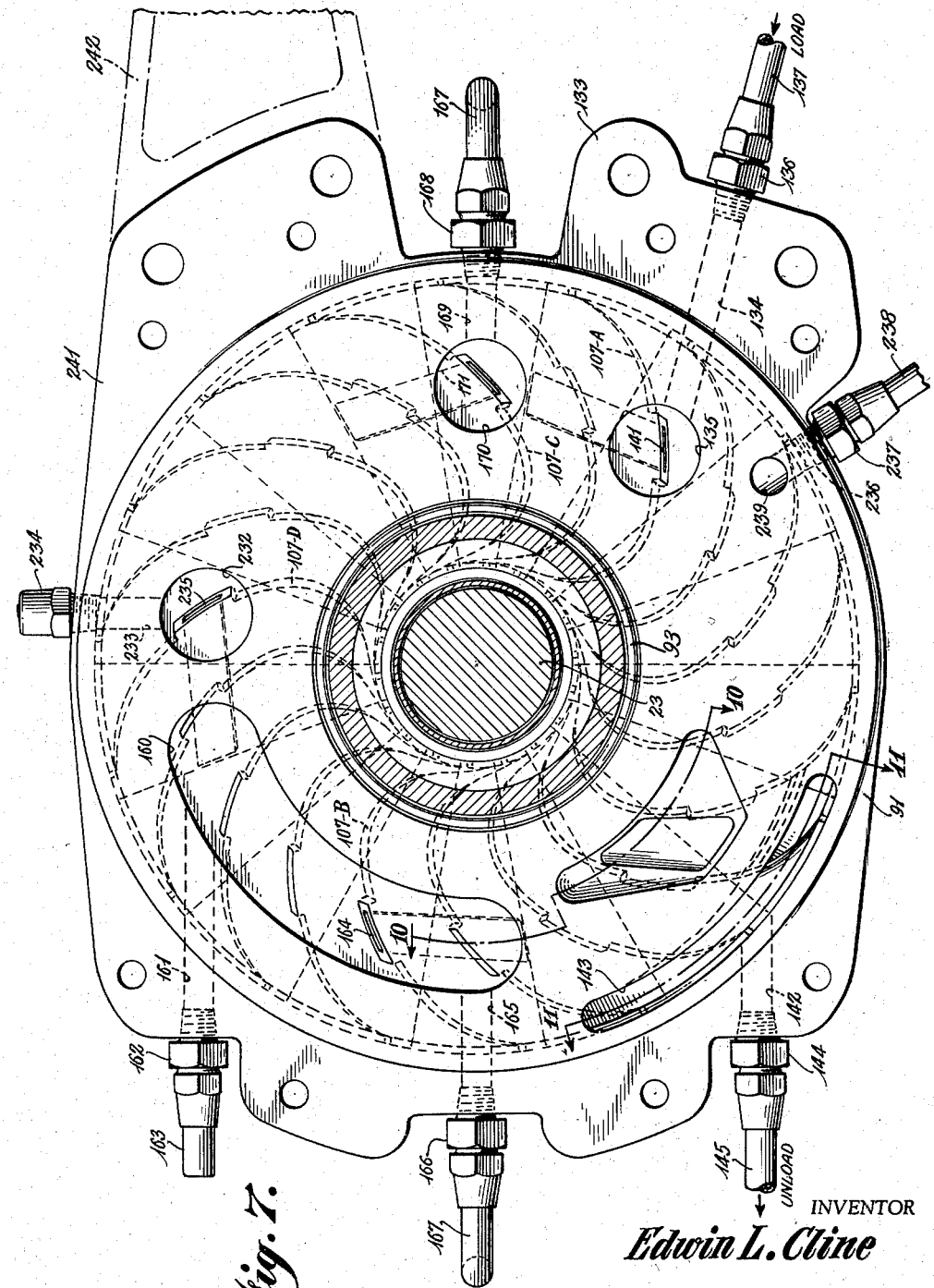
Fig. 7 is a vertical sectional view corresponding to a section taken on the line 7—7 of Fig. 5, but illustrating a modified form of stator in which the vortex control ring has been omitted.

Referring now to Figs. 7 and 12, the plate 91 is contoured so as to provide a laterally extending lug 133 into which a passageway 134 is drilled and communicates at its inner end with a circular opening 135. The outer end of the passageway 134 is threaded to receive a conventional fitting 136, which connects a water supply or loading tube 137 thereto. The supply tube 137 is diagrammatically shown in Fig. 1 as connected with a pipe 138, which in turn is connected by a flexible hose 139 with a source of water or other liquid under pressure. A loading valve 140 is connected in the tube 137 and is adapted to control the flow of water or other liquid into the brake housing. The loading valve 140 is of conventional construction adapted to be controlled from a remote point, either electrically or hydraulically, by any suitable means, which in the case of an electrical control may comprise switch means such as that disclosed in my prior patent, supra. It will be noted from Fig. 7 that the opening 135 is disposed opposite the inner edge of the loading vane 107-A. The vane 107-A is identical to the hollow vanes 107-B, 107-C and 107-D and is also identical, except in shape, to the hollow vane 107′ illustrated in detail in Figs. 17 to 19 to which reference will now be made.

The hollow vanes are all preferably of laminated construction assembled from stainless steel sheet metal stampings. Thus, each hollow vane comprises plates 107a and 107b separated by core pieces 107c and 107d spaced apart to provide a passageway 107e. Each of the end plates 107a and 107b is 1/32 inch thick, and the core pieces 107c and 107d are 1/16 inch thick, so that the total thickness of the vane is 1/8 inch. Tabs 107f, 107g, and 107h project from the curved portion of the vane and these are adapted to be received in the notches 104, 105 and 106 in the stator shell, which must of necessity be made of a width corresponding to the overall thickness of the vane. The passage 107e may be made of any suitable size, but in the present construction it has a height of 1/2 inch and a width of 1/16 inch. The several laminations comprising the hollow vane may be permanently secured together in any manner, for example, by welding or brazing. It will be understood that the hollow vane may be given any suitable configuration to correspond to the cross-sectional shape of the particular torus shell in which the same is to be mounted.

Referring now to Fig. 6, the hollow vane 107–A is provided with a passageway 141 communicating at its inner end with a slot 141a in the vortex ring section 112, and through which passage the brake liquid admitted into the housing through the conduit 137 under control of the loading valve 140 can pass to a low pressure zone of the working circuit.

The stator plate 91 is also provided with a passage 142 (Fig. 7) which communicates at its inner end with an elongated arcuate passageway 143 cut through the plate 91 and arranged concentric with the axis of the shaft 23. A conventional fitting 144 is threaded into the outer end of the passage 142 and connects a discharge or unloading tube 145 to said plate. The tube 145 is connected with a discharge pipe 146 (Fig. 1) attached to one end of a hose or flexible conduit 147, the opposite end of said hose communicating with a suitable drain (not shown). An unloading valve 148 is connected in the tube 145 between the fitting 144 and the discharge pipe 146 and, like the loading valve 140, is of conventional construction and preferably of the type adapted for remote control by either electrical or hydraulic means.

It will be understood that the stator vanes 107, 107–A, 107–B, 107–C and 107–D provide a series of pockets in the stator shell 97 to form one-half of the working circuit for the brake liquid, the other half of the working circuit being formed by the confronting pockets in the rotor 67. One of the stator pockets is identified by the numeral 150 in Fig. 5 and is modified to adapt it to serve as a pumping pocket for effecting the discharge of brake liquid from the working circuit when it is desired to reduce the load absorption capacity of the brake unit, and also for effecting circulation of the brake liquid through a heat exchanger to effect cooling thereof, as will be explained in greater detail later. Thus, the portion of the stator shell 97 opposite the arcuate discharge opening 143 and defining the outermost part of the pocket 150 is partially severed between adjacent vanes 107 and bent downwardly as indicated at 151, whereby to establish communication between the interior of the stator shell 97 and the arcuate passageway 143 in the plate 91. A ring section 152 is mounted in the pocket 150 to facilitate diversion of a portion of the brake liquid from the working circuit into the discharge passageway 143. A partition or baffle 153 is disposed in the lower portion of the pocket 150 blocking the entrance of brake liquid into the "dead" portion of said pocket between the ring section 152 and shell 97 and serving to direct the brake liquid into the passageway 143. Accordingly, when the brake unit is in operation, water or other suitable brake liquid will continuously tend to flow out of the radially outermost portion of the pocket 150 into the passageway 143, and if the unloading valve 148 should then be open, the action of the vaned rotor 67 will force the brake liquid out of the brake unit 6 through the unloading tube 145 to thereby reduce the volume of brake liquid in the brake housing and correspondingly reduce its load absorption capacity.

In order to facilitate unloading of the brake unit 6, and in order to avoid creating either a subatmospheric or superatmospheric pressure condition within the brake housing 91, 98, means is provided to assure the ready ingress or egress of air, as conditions may require, from the working circuit of the dynamometer. To this end, the housing plate 91 is provided with an arcuate air-collecting slot or expansion chamber 160, Fig. 7, disposed concentric to the axis of the shaft 23, but in non-registering relation with the liquid discharge passageway 143. A passageway 161 is drilled into the plate 91 and its inner end communicates with the upper portion of the chamber 160. The outer end of the passageway 161 has a conventional fitting 162 threaded therein for connecting a vent tube 163 to the plate 91. The tube 163 is always open to the atmosphere so that air can be freely exhausted therethrough from the air chamber 160 during loading, or pass into the chamber to prevent the formation of a vacuum condition within the brake unit during unloading. A hollow vane 107–B is disposed in the zone of the air chamber 160 and is provided with an air-bleed passageway 164 similar to the passageway 141, which establishes communication between the air chamber 160 and the low pressure region of the working circuit through a slot 164a in the vortex ring section 112 (see Fig. 6). More than one of the vanes in the region of the air chamber 160 may be of the air-bleed type, if desired.

A second air vent passageway 165 is drilled into the edge of the housing plate 91 and its inner end communicates with the lower portion of the air chamber 160. A conventional fitting 166 is threaded into the outer end of the passageway 165 and connects one end of an air tube 167 thereto. The other end of the air tube 167 is connected by a conventional fitting 168 to the outer end of still another air vent passageway 169 drilled into the diametrically opposite edge of the plate 91. The inner end of the passageway 169 communicates with an air-collecting opening 170 formed in the plate 91. The opening 170 is disposed opposite the inner edge of still another hollow stator vane 107–C having an air-bleed passageway 171 aligned with a slot 171a in the vortex ring section 112 for establishing communication between the opening 170 and the low pressure region of the working circuit. Any air bled from the working circuit through the air-bleed passageway 171 is enabled by virtue of the air tube 167 to pass over to the air chamber 160 and, thence, to the atmosphere through the air vent tube 163.

The air-bleed vanes 107–B and 107–C are so arranged in the stator as to provide an efficient air-bleed which will allow the air to escape from the housing without carrying any liquid with it; otherwise, the maintenance of a constant load would be affected. A plurality of air-bleed vanes is preferable to a single vane, and in the present construction the two air-bleed vanes 107–B and 107–C are so located in relation to one another that a pressure differential will exist as a result of the slight pulsations set up in the operation of the unit allowing the air and any liquid entrained thereby to circulate from one bleed to the other with the air separating from the liquid as it passes through the expansion chamber 160 on its way to the outside atmosphere. These slight pulsations also have the effect on the air-bleed vane 107–C of tending to "milk" the expansion chamber 160 of liquid to thereby keep it substantially dry.

The distance between the confronting edges of the rotor and stator vanes has a marked effect upon the power absorption capacity of a unit having the angularly disposed vanes. A clearance of about 3/32 inch has been found to be optimum for the present unit. Tests have shown that reducing the clearance space below 3/32 inch produced a very slight increase in the power absorption capacity, but practical clearance considerations negative the advisability of operating with a clearance less than 3/32 inch. On the other hand, increasing the clearance from 3/32 inch to 3/8 inch resulted in a decrease of as much as 70% in power absorption capacity. Hence, the 3/32 inch dimension gives above constitutes a compromise between power loss and practical clearance from a construction standpoint.

It is desirable to make the rotor and stator vanes as thin as practicable for the reason that tests have shown that the power absorption capacity of a given unit can be increased by the use of thinner vanes. However, load factor considerations require a minimum vane thickness to withstand the violent shock and vibration effects encountered in actual use and, therefore, in brake units of the size disclosed herein, the solid rotor and stator vanes are stamped from stainless steel sheets of a thickness of 1/16 inch. The hollow vanes must of necessity have an overall thickness greater than 1/16 inch, but actually the combined thickness of the two plates 107a and 107b shown in Figs. 17 to 19 is only 1/16 inch.

In Fig. 17, the vane 107' is illustrated as truly semi-circular and as having a radius R of 1.531 inches. Such vane obviously would conform to the contour of a truly semi-cylindrical torus having a radius of 1.531 inches, provided the vane is mounted in the torus in a plane parallel with and passing through the axis of the stator. The truly semi-circular vane will also properly fit in a shell having the generally oval cross-sectional shape shown in Fig. 20, when the vane is disposed with its front edge truly radial and the body portion of the vane is disposed at an angle of 45° to the axis of the shell. The contour of vane 107' would, of course, have to be modified to fit in the rotor shell 76 and the stator shell 97 on a 45° angle.

Fig. 20 also illustrates the typical diametrical dimensions of stator and rotor shells embodying the principles of the present invention and wherefrom it will be self-evident that hydro-kinetic devices embodying the same are truly "junior" in size.

Thus, the pockets in the shell have an outer dimension conforming to a diameter of 8.375 inches, whereas the inner portions of the pockets have a dimension conforming to a diameter of 2.25 inches, so that the maximum radial dimension of the pockets is only 3.0625 inches. The maximum outside diameter of the cover member 98 is only 9 inches, which is truly remarkable when the fact is considered that the present unit is capable of absorbing 125 H. P. at speeds of 1000 to 4000 R. P. M.

Equally remarkable is the fact that the present brake unit with its single working circuit has a power absorption capacity approximately equal to that of a commercial 18 inch unit having two working circuits constructed in accordance with my prior patent, supra.

It is well understood in connection with hydraulic power absorption apparatus, either dynamometers or brakes, that the absorption of power by the liquid in the working circuit of the dynamometer causes the liquid to become heated. In other words, the energy absorbed by the liquid in the brake unit is converted into heat, and such heat must be dissipated if vaporization of the brake liquid is to be avoided. It is equally well known that, if vaporization of the brake liquid occurs within the brake housing, vapor pockets are formed in the working circuit and unsteady, unsatisfactory operation of the unit results. The present brake unit overcomes the foregoing objection by incorporating therein a heat exchange apparatus capable of quickly dissipating the heat imparted to the brake liquid as a result of absorption of power applied to the driven roll 5 of the dynamometer apparatus 1. However, it is to be understood that the present brake unit is useful without a heat exchanger in environments or under conditions which do not cause objectionable heating of the brake liquid.

The heat exchange circuit disclosed herein embodies the principles of the "closed" circulating system disclosed in my prior patent, supra, although the present heat exchanger is constructed and arranged differently in keeping with the objective of providing a power absorption unit of extreme compactness and unusual absorption capacity for its size.

The heat exchanger is of annular construction and is generally identified by the numeral 180 in Fig. 5. The heat exchanger 180 comprises a casing including an outer, generally cylindrical member 181, formed of a sheet of stainless steel with its ends overlapped slightly and welded together at 182, as best illustrated in Fig. 12, and an inner, generally similar cylindrical member 183 having its ends lap-welded as indicated at 184. A heat exchange element 185 of substantially the same dimension as the length of the cylindrical members 181 and 183 is wound into generally spiral form and disposed between said members. The heat exchange element 185 is preferably formed of two sheets of copper having registering spaced depressions or dimples 186 bonded together in a well understood manner, the sheets being secured together at their longitudinal edges and ends by water-tight seams so that any liquid within the heat exchange element 185 is required to travel therethrough without mixing with any of the brake liquid contacting the exterior of said element. The outer end of the heat exchange element 185 may be attached to the cylindrical member 181 at the joint 182, if desired, during the assembly of the heat exchange device.

The cylindrical members 181 and 183 and the heat exchange element 185 are disposed between a pair of annular channel-like end members 187 and 188 (Fig. 5), each having inner and outer marginal flanges with the flanges of one end member disposed in confronting relation to the flanges of the other. The flanges on the end member 187 provide a recess 189 for the reception of one end of the cylindrical members 181 and 183 and also one longitudinal edge of the spirally wound heat exchange element 185, said recess being filled with lead or suitable plastic sealing material 190 to provide a liquid-tight joint between said end member and the portions of said cylindrical members and the edge of said heat exchange element disposed in said recess. A similar recess 191 formed in the other end member 188 contains similar sealing material 192 for providing a liquid-tight seal between the opposite ends of the cylindrical members 181 and 183 and the other longitudinal edge of the heat exchange element 185. Thus, the heat exchanger 180 is assembled as an annular unit independent of the rotor and stator assembly.

The heat exchanger 180 surrounds the stator mounting sleeve 56 in juxtaposed relation to the housing plate 91, and a rubber gasket 195 is preferably disposed between said housing plate and the outer face of the end member 187. The end member 187 has a flange 196 adapted to telescope with a shoulder 197 formed on the housing plate 91 for substantially axially aligning the heat exchanger 180 with the brake unit 6. A rubber gasket 198 is disposed between the outer face of the end member 188 and a corrosion resisting header casting 199.

The heat exchanger assembly 180 is held against rotation relative to the stator mounting sleeve 56 by a conventional key 200 disposed in mating keyways formed in the sleeve 56 and header 199, respectively, as will be apparent from Fig. 14. The heat exchanger 180 and header 199 are held against moving longitudinally with respect to the sleeve 56 by a nut 201 (Fig. 5) mounted upon threads 202 formed on the sleeve 56 in a region outwardly of the header 199. A locking ring 203 is disposed between a flange 204 on the header 199 and the nut 201 to lock said nut in tight position. The header 199 is provided with a plurality of passageways 205 which extend through the flange 204 and communicate with a space 206 between the exterior of the sleeve 56 and the inner cylindrical member 183 of the heat exchanger 180. The lower passageway 205 is particularly adapted to serve as a bleeder for draining any brake liquid discharged as leakage into the space 206 through the holes 132 in the sleeve 56.

The discharge passageway 143 in the housing plate 91 communicates with a generally spiral cooling chamber or space 207 (see Figs. 5 and 12) formed between the exterior of the heat exchange element 185 and the inner surfaces of the cylindrical casing members 181 and 183, through a discharge port 208 formed in the gasket 195, and a port 209 formed in the end member 187 of the heat exchanger. It will be understood from Fig. 11 that no sealing material 190 is disposed in the end member 187 in the region thereof juxtaposed to the port 209. The port 209 thus serves as an inlet to the heat exchanger 180 for brake liquid from the pumping pocket 150 of the stator shell 97. The end member 187 is also provided with a discharge port 210 which communicates with the space 207 in the heat exchanger 180 in a region adjacent the inner cylindrical member 183. The gasket 195 has a port 211 which communicates with the port 210 and the housing plate 91 has a return port 212 aligned with the port 211 and which establishes communication between the space 207 of the heat exchanger 180 and the "dead" portion of the pumping pocket 150 above the partition 153, as viewed in Fig. 5. In other words, the ports 210, 211 and 212 combine to serve as a return conduit for cooled brake liquid from the heat exchanger 180 back to the working circuit of the brake unit. As is clearly shown in Fig. 10, no sealing material is disposed in the end member 187 in juxtaposition to the port 210.

A "dummy" stator pocket 150a (Figs. 5 and 6) is disposed diametrically opposite to the pocket 150 containing the ring section 152 and is provided with a similar ring section 152a and a baffle 153a to offset the disturbing effect of the ring section 152 to brake liquid flow. The baffle plate 153a has an orifice 214 for restricting flow to an extent approximating the restriction to normal flow offered by the pumping pocket 150.

The header 199 is provided with an inlet passage 215, Figs. 14 and 15, having a conventional fitting 216 threadedly mounted therein for connecting one end of the supply pipe 138 thereto. The inlet passage 215 is flared in a circumferential direction and greatly enlarged in the region thereof which opens through the inner face of the header 199, as is best illustrated in Fig. 14. The gasket 198 has a port 217 corresponding in configuration to the shape of the elongated end of the inlet passage 215. The edges of the sheets of the heat exchange element 185 are spread apart in the zone opposite the passageway 215 to receive an elongated arcuate sleeve 218 therein, said sleeve extending through a correspondingly shaped port 219 in the end member 188. The sleeve 218 is soldered or brazed to the heat exchange element 185 and may be similarly secured to the end member 188 so that no leakage occurs between said sleeve and heat exchange element. The arrangement thus provides for introduction of cooling water through the inlet passage 215 into the innermost convolution of the heat exchange element 185 for flow therethrough to absorb the heat in the brake liquid passing over the exterior surfaces of said heat exchanger.

The header 199 is also provided with a discharge or outlet passageway 225, best shown in Figs. 14 and 16, which opens through the inner face of said header. The gasket 198 has a port 226 corresponding in configuration to the shape of the passageway 225 where it merges through the header 199. The edges of the sheets of the heat exchange element 185 are spread apart in the zone opposite the passageway 225 to receive an elongated arcuate metal sleeve 227 therein, said sleeve extending through a correspondingly shaped port 228 in the end member 188. The sleeve 227 is soldered or brazed to the heat exchange element 185 and may be similarly secured to the end member 188, so that no leakage occurs between said sleeve and heat exchange element. A conventional fitting 229 is threaded into the outlet of the discharge passageway 225 for connecting one end of the drain pipe 146 to the header 199. Thus, cooling water flowing from the outer end of the heat exchange element 185 can readily discharge to waste through the drain pipe 146 and drain hose 147 (Fig. 1).

The brake liquid is forced by the pumping action of the rotor 67 to flow at high velocity over the outer surfaces of the heat exchange element 185 to effect rapid cooling of the brake liquid. In the normal operation of the brake unit described hereinbefore, the spiral space 207 in the heat exchanger 180 between the inlet port 209 and the discharge port 210 is completely filled with brake liquid, and the volume of brake liquid in excess of that required to fill such space is utilized for power absorption purposes. Thus, a "closed" circulating system is provided wherein the volume of brake liquid is constant for any given load. The cross-sectional area of the stator discharge port 143 is sufficiently greater than that of the stator return port 212 as to maintain a slight back pressure at all times on the brake liquid passing through the heat exchanger 180.

Air-locking of the spiral space 207 of the heat exchanger 180 is avoided by providing a series of five small air-bleed holes 230 (Figs. 5 and 12), one located at the top of each spiral passage and extending through the sealing material 190 and the end member 187. The gasket 195 has an elongated slot 231 formed therein which is large enough to establish communication between all of the air-bleed holes 230 and a circular opening 232 formed in the stator plate 91. A passageway 233 drilled in the plate 91 communicates at its inner end with the opening 232 and has a conventional exhaust air vent valve 234 threadedly mounted in its outer end, and constructed so as to exhaust only air, and no liquid, from the opening 232.

The opening 232 also communicates with the center of the working circuit through an air-bleed passage 235 formed in stator vane 107–D which has its inner end located opposite the opening 232 and which vane may be associated with a vortex ring section, as in Fig. 5, or omit such vortex ring section as shown in the modification in Fig. 7. Thus, any brake liquid that may flow through the air-bleed holes 230 into the opening 232 is readily returned to a low pressure zone of the working circuit through the vane passage 235. It will be understood that air bled into the opening 232 from the brake liquid space 207 in the heat exchanger 180 and any air vented from the vortex of the working circuit through the vane passage 235 can escape to the atmosphere through the air exhausting valve 234, as conditions may require.

The stator plate 91 is further provided with drain means for the brake liquid space 207 in the heat exchanger 180. Thus, the plate 91 has a radial passage 236 (see Figs. 7, 12 and 13) threaded at its outer end to receive a conventional fitting 237 connected to a drain conduit 238. The passage 236 communicates at its inner end with a lateral passage 239 in the plate 91, which in turn communicates with a drain passage 240 extending through the gasket 195, heat exchanger end member 187 and the sealing material 190 to the space 207, as best shown in Fig. 13. A normally closed valve (not shown) is connected in the drain conduit 238 and is adapted to be opened to effect draining of brake liquid from the heat exchanger 180, whenever desired.

Referring now to Figs. 1 and 3, the stator housing plate 91 has a lug 241 projecting outwardly therefrom in a direction toward the channel member 9 of the frame assembly 2. One end of a torque arm 242 is secured to the lug 241 by a plurality of cap screws 243. The other end of the arm 242 is connected to a rod 244 of a torque bridge device 245 adapted for use with indicating means (not shown) for visually indicating the power being developed by the engine of the vehicle undergoing test. The torque bridge device 245 is mounted upon a support 246 suitably connected to the channel members 11 and 12. The torque bridge device 245 forms no part of the present invention and, therefore, has not been illustrated or described in detail herein.

It will be apparent from the foregoing description, that when a vehicle has its rear or driven wheels engaged with and cradled between the drive roll 5 and the idle roll 4 of the dynamometer 1, the rotor assembly 67 will be driven at the same speed as the drive roll 5 and will cause the brake liquid to travel through the working circuit, formed by the confronting pockets and vanes in the rotor and stator shells 76 and 97, at very high velocity. Rotation of the rotor 67 forces a portion of the brake liquid out of the working circuit through the ports 143, 208 and 209 into the spiral space 207 in the heat exchanger 180, wherein it will be caused to travel in a corresponding spiral path in contact with the confining surfaces of the convolutions of the heat exchange element 185. The brake liquid thus cooled will be discharged from the heat exchanger 180 through the ports 210, 211 and 212 into the "dead" portion of the pumping pocket 150 for return to the working circuit at a rate equal to the rate at which the brake liquid is displaced from the working circuit by the pumping action of the rotor 67. Hence, a volume of brake liquid equal to that displaced from the working circuit will be continuously returned to the working circuit so that for any given load the volume of brake liquid will be maintained constant. The brake liquid circulated over the exterior of the heat exchange element 195 is quickly cooled by water continuously flowing through the space between the sheets comprising said heat exchange element, preferably by flow in a direction opposite to that in which the brake liquid travels.

The load absorption capacity of the brake unit 6 can be varied at will by manipulation of the loading valve 140 and the unloading valve 148. Opening of the loading valve 140 will admit water into the working circuit through the conduit 137, passage 134 in the stator plate 91 to the opening 135 in said plate and, hence, through the passage 141 in the loading vane 107–A, so that the admission of additional brake fluid into the working circuit occurs at the center of the vortex or low pressure zone of the working circuit. However, when it is desired to reduce the load absorption capacity of the brake unit, the unloading valve 148 is opened, which permits the rotor 67 to force brake liquid out of the housing by flow through the passages 143 and 142 in the plate 91, and thence into the conduit 145. By varying the volume of brake liquid in the brake unit in the manner just described, any desired load may be imposed upon the engine of the vehicle being tested, the "closed" system making it easy to repeat various tests under any desired load conditions as often as necessary, as explained more fully in my prior patent, supra.

The passage 143 associated with the pumping pocket 150 is of such design as to insure the circulation of sufficient brake liquid through the heat exchanger to effect efficient heat dissipation and yet permit the remainder of the fluid entering said pocket to circulate in a manner most closely approaching the normal vortex circulation which occurs in the remaining stator pockets. Some disturbance in flow at the pocket 150 is unavoidable, but this can be counteracted or compensated for through the provision of the dummy pocket 150a disposed diametrically opposite thereto. The dummy pocket 150a, as previously explained, is constructed to simulate the same disturbance as that which occurs at the pumping pocket 150. The orifice 214 in the partition 153a of the dummy pocket 150a restricts flow to an extent approximating the restriction to normal flow offered by the pumping pocket 150. Thus, the flow of liquid entering and discharging from the dummy pocket is approximately equal to that at the live pocket 150 and the resulting disturbance to the normal working circuit flow is substantially the same, whereby a balancing of the disturbing forces is effected resulting in smooth operation of the unit.

While brake liquid is being admitted into or displaced from the working circuit to vary the load absorption capacity of the unit, air is correspondingly expelled from or admitted into the unit through the passages 164 and 171 in the air-bleed vanes 107–B and 107–C. Thus, no air pressure in excess of atmospheric pressure is built up in the working circuit to create pressures that would otherwise have to be overcome in order to add liquid to the working circuit. On the other hand, as brake liquid is removed from the working circuit to decrease the load, these same air-bleed passageways let air into the vortex to avoid creating subatmospheric pressure conditions in the working circuit. Smooth operation of the unit is also assured through the bleeding of any free air which may be present in the brake liquid in the heat exchanger, through the holes 230 which communicate with the opening 232 in the stator plate 91 and with the passage 235 in the air-bleed vane 107–D. Such bleeding of air precludes the accumulation of any substantial bodies or slugs of air in the heat exchanger which, upon return to the working circuit would result in erratic and unreliable operation of the brake unit. The greater the number of air-bleed passages provided, the drier will be the air bled from the system, as previously explained.

The brake unit 6 will rotate as a unit through an angle corresponding to the torque or horsepower being developed, and the torque arm 242 will turn through a corresponding angle and actuate the torque bridge device 245 accordingly, which in turn will operate indicating means (not shown) to visually indicate the horsepower being developed, as is well understood by those familiar with the art.

Fig. 21 illustrates a modified form of stator construction adapted for ready fabrication from plates and sheet metal parts, in which the stator housing comprises a flat housing plate 91a having a central opening 92a provided with threads for mounting the same upon a stator supporting sleeve 56a. The housing plate 91a has an annular groove 96a formed in one face thereof, said groove being concave in radial cross-section and having a shape complemental to that of the exterior surface of a stator shell 97a. The plate 91a is provided with an annular recess 94a adapted to receive one end of a ring 95a having a flange 95b adapted to seat in the groove 94a. The other end of the ring 95a terminates in a plane flush with the inner peripheral edge of the stator shell 97a. A plurality of stator vanes including air-bleed vanes 107–E and 107–F, similar to the vanes 107–B and 107–C, are mounted in the stator shell 97a, in the same manner as the vanes of the stator shell 97. The plate 91a, ring 95a, shell 97a and the vanes disposed therein are assembled and held in clamped relation and then hydrogen-brazed to permanently secure the same together. After the assembly has been brazed, it is mounted upon the sleeve 56a. A dome-shaped cover 98a encloses a rotor 67a, identical with the rotor 67, and a plurality of screws 102a secure the cover 98a to the ring 95a. A sealing ring 103a is disposed between the edge of the cover 98a and the flange 95b to prevent leakage of brake liquid from the stator housing. Vortex control rings 87a and 112a are shown in dot-and-dash lines and may be optionally assembled with the rotor and stator. Other parts shown but not specifically mentioned have been identified by the same numerals applied to corresponding parts of the hydro-kinetic brake first described.

Referring now to Figures 22 and 23, a torus shell 250, like the rotor and stator shells 76 and 97, of truly radial cross-section is diagrammatically shown provided with flat vanes 251 having a front straight edge thereof disclosed on a true radius, but having the body portion thereof arranged on an angle of 45° to the axis of the torus. Fig. 24 shows the shape of the vane required to fit such torus and wherefrom it will be apparent that the vane is far from truly semi-circular. Fig. 25 is an edge view of the vane and indicates its flat condition.

Leaning the front edge of the vane off a true radial position either toward the direction of rotation or away from the direction of rotation has its effect upon the power absorption capacity of the unit and the pocket pulsations. Fig. 26 diagrammatically illustrates a stator torus 252 similar to the torus shown in Fig. 23, but wherein the front edge 253 of a vane 254 is disposed on an angle of 5° to a radial line 255, with the angle of inclination originating at the intersection of the radial line 255 with the outer periphery of the stator. The inner edge 253 of the vane 254 is thus advanced with respect to the radial line 255 at the inner margin of the stator. The direction of rotation of the rotor (not shown) relative to the stator 252 is indicated by the arrow 256. Fig. 27 illustrates the shape of the vane 254 and Fig. 28 indicates the flat condition of the vane. It will be understood, of course, that the vanes of the rotor used with the stator 252 may have the edges thereof disposed on a true radius as illustrated in the torus shown in Fig. 22, or that the front edge of the rotor vane may be inclined in either the same or the opposite direction to the stator vane shown in Fig. 26. It will also be understood that the front edge of the stator vane can be inclined in the opposite direction from that shown in Fig. 26.

Figs. 29, 30 and 31 also diagrammatically illustrate a torus 257 having a true radial cross-section but wherein a vane 258 has a curved portion instead of being made completely flat. The straight edge 259 of the vane 258 may be disposed either on a true radial line as in Fig. 22 or offset on an angle of about 5° as shown in Fig. 26, but in any event, a marginal portion 259a of the vane, about ½ inch wide, adjacent the edge 259 is flat and disposed on an angle of 45° with respect to the axis of the torus. A portion 259b of the body of the vane is curved on a radius of 22³⁹⁄₃₂ inches, with the center of the radius perpendicular to the flat body portion 259a. The curving of the vane 258, as shown, reduces the circulatory path of the brake liquid nearest the pressure side of the vane and slightly improves the action of the unit. A curved vane is preferred for strength and low speed torque, but a flat vane has the advantage of its construction simplicity.

It will be understood that the off-radial vane arrangement of Fig. 26 and the curved vane of Fig. 29 may be employed in either or both the rotor and stator disclosed in Figs. 5 and 21. It will also be understood that the foregoing applies to the hollow vanes 107–A to 107–F, inclusive, as well as to the solid vanes disclosed herein.

It will be apparent that, since the average load on each vane is equal to the total torque divided by the number of vanes, the greater the number of vanes used, the less their individual loading will become, and, therefore, the stronger will be the overall construction of the machine. However, in view of the extremely small size of the present brake unit 6, a very large number of vanes cannot be employed, otherwise, a point will be reached where the power absorption capacity will be decreased materially, as well as increasing circulation difficulties, particularly at the hub or inner margin of the torus shell where the vanes would be too close together to permit the necessary return flow of brake liquid from the stator to the rotor. By the same token, too few vanes cannot be used without sacrificing power absorption capacity. Hence, an acceptable compromise must be made in selecting the number of vanes to be used in both the rotor and stator.

Since vibration becomes increasingly important with powerful units of such small physical dimension, great care must be taken to arrive at a vane combination which will give the best compromise of all the factors influencing performance and vibration. It must be recognized that the hydraulic loading of each individual vane in the toroidal working circuit is not constant. Therefore, pulsating forces of varying amplitudes are applied to each stator vane as each rotor vane passes it, and a similar reaction occurs on each rotor vane as it passes each stator vane. The frequency of these forces can combine into serious harmonic vibrations and complex force waves can be generated that travel in the same direction, or in the opposite direction to normal rotation around both the rotor and the stator, and usually at speeds greater than the speed of rotation. A practical solution to these waves of force, is to arrange the rotor and stator vanes in such a way that the forces are substantially balanced diametrically across the face of the working circuit, or balanced in thirds, one-quarters, etc. Vane number combinations to accomplish this can be selected so that a combination of forces generated by vanes approaching one another will oppose those forces generated by vanes aligned with one another. By one, or a combination of these two methods, forces over the face of the working circuit are balanced about the geometrical center, or shaft center, as is a balanced lever about its fulcrum, thus avoiding deflections in the rotor shaft or other members of the assembly which would create annoying, and in many instances, destructive vibration frequencies.

In general, it may be stated that a greater number of rotor vanes than stator vanes should be employed. This is done to avoid pulsations of the working circuit circulation in each pocket as the rotor and stator pockets pass one another. The greatest restriction to vortex circulation, as far as the vanes are concerned, is the point near the hub, or inner margin of the torus, where the liquid returns from the stator to the rotor. If a greater number of rotor vanes than stator vanes is employed, there are always two wetted surfaces of the rotor vanes opposing flow. Thus, the building up and reduction of restriction is overcome, and more uniform vortex flow will thereby be accomplished in both the rotor and the stator.

In general, it is believed that each of the pockets in the rotor should be smaller in face area than the individual pockets in the stator, but the percentage difference should be just slightly less, but nevertheless sufficient to avoid these pulsations since heavy hydraulic forces are thereby reduced, which, if allowed to exist, would be very detrimental to the life of the equipment, and contribute greatly to the problem of eliminating harmonic vibrations and this confirms the preference for the greater number of vanes being on the rotor.

Even though hydraulic impulses, or intermittent forces are held to a minimum, there will always be varying forces applied to the vanes, and therefore, the frequency of their occurrence and the timing of the various frequencies to avoid harmonic vibrations is important. It has been found that a vane combination of twenty-one rotor vanes and eighteen stator vanes is best suited for a brake unit of the size disclosed herein. This combination has a common denominator of 3, thereby causing third order beats and seventh (21 rotor vanes÷3=7) order waves of force. Such an order of vibration is not low enough in frequency, to cause severe amplitudes of vibration in the hydraulic brake unit. The total number of torsional impulses per revolution is equal to 7×18 (stator vanes)=126.

Fig. 9 diagrammatically illustrates the relative angular relationship between the twenty-one vanes of the rotor and the eighteen vanes of the stator. Hence, the rotor vanes will be equally spaced apart 17.142° and the stator vanes will be equally spaced 20° apart. It will be noted from Fig. 9 that only one stator vane marked V is truly aligned with one rotor vane marked V', and also that stator vanes Y and Z, which are disposed on an angle of 120° on opposite sides of the stator vane V are almost radially aligned with rotor vanes Y' and Z'. Actually, the rotor vanes Y' and Z' are 119.994° from the rotor vane V', or only .006° from 120°, so that for practical purposes the rotor vanes Y' and Z' may be considered as simultaneously aligned with the stator vanes Y and Z when the rotor vane V' is aligned with the stator vane V. Hence, the thrust forces tending to produce harmonic vibrations are substantially equally distributed 120° about the axis of rotation of the rotor.

In addition, in order to obtain the greatest power absorption capacity per unit size in power absorption devices of the hydro-kinetic type, it is necessary to increase the velocity of the brake liquid in the working circuit as much as possible. Vanes installed in the rotor and stator torus members at an angle to a plane parallel with and passing through the rotor axis, so that angularly disposed pockets are formed with their faces pointing toward each other and with the rotor pocket faces pointing in the direction of rotation, are required to increase vortex velocities above that experienced with conventional radial (90°) vanes parallel to planes passing through the axis of the rotor shaft. Certain advantages can also be derived by combining angular (45°) vanes with a deep vortex path, as will be set forth more fully hereinafter.

Fig. 32 is a diagrammatic view illustrating a rotor 265 having vanes 266 and a stator 267 having vanes 268 radially disposed and lying in a plane parallel with and passing through the axis of the rotor, or in other words, at an angle of 90° to the plane of the rotor and stator. The rotor 265 and stator 267 are each truly semi-circular in cross-section and the vanes 266 and 268 are correspondingly shaped and have the radius R, which is equal to 1.531 inches.

Fig. 33 is a diagrammatic view of a rotor 269 having vanes 270 and a stator 271 having vanes 272. The vanes 270 and 272 are disposed on an angle of 90° to the plane of the rotor 269 and stator 271, and have a width equal to 1½ times the radius R of the torus cross-section minus 3/16 inch. Thus, the vanes 270 and 272 shown in Fig. 33 are greater in width than the vanes 267 and 268 of Fig. 32 by an amount equal to ½R minus 3/16 inch. This increase in width provides a longer flow path for the brake liquid which reduces the power absorption capacity of the unit, as will be pointed out more fully hereinafter.

Fig. 34 is a diagrammatic view of a rotor 273 having 90° vanes 274 and a stator 275 having similar vanes 276. The vanes have an overall width equal to 1½ times the radius of the cross-section of the torus.

Fig. 35 is a diagrammatic view of a rotor 277 having vanes 278, similar to the rotor 265, and a stator 279 having vanes 280 similar to the stator 275. Thus, the rotor vanes 278 have a width equal to R and the stator vanes 280 have a width equal to 1½R.

By way of contrast, Fig. 36 diagrammatically illustrates a rotor 281 having vanes 282 and a stator 283 having vanes 284. The vanes 282 and 284 are truly semi-circular and have a radius R equal to 1.531 inches, but are disposed on an angle of 45° to a plane parallel with and passing through the axis of rotation. The cross-sectional shape of the rotor and stator is, therefore, non-semi-circular and is somewhat oval shaped as previously shown in Fig. 20. The disposition of the vanes on a 45° angle, as compared to vanes disposed on a 90° angle, greatly increases the power absorption capacity of the unit as will be pointed out more fully hereinafter.

Fig. 37 is a diagrammatic view of a rotor 285 having vanes 286 and a stator 287 having vanes 288. The rotor 285 is truly semi-circular in cross-section and has a radius R. The vanes 286 are disposed in the rotor 285 on an angle of 45° and, therefore, will have the configuration illustrated in Fig. 24. The stator vanes 288 are disposed on an angle of 45° to the axis of the rotor and are truly semi-circular as in Fig. 17. Accordingly, the cross-section of the stator 287 is the same as that of the stator 283 of Fig. 36.

Fig. 38 diagrammatically illustrates a rotor 289 having vanes 290 disposed therein on an angle of 45° to the axis of rotation, and a stator 291 having similarly disposed vanes 292. The cross-section of both the rotor 289 and the stator 291 is a true semi-circle having a radius R. In other words, both the rotor 289 and the stator 291 are like the rotor 285 of Fig. 37. It will also be apparent that the rotor 289 and stator 291 are like the semi-toroidal rotor shells 76 and 97 shown in Figs. 5 and 21. These constitute the preferred form of the invention.

It is generally understood that pocket pulsations in the rotor and stator are generated by the passing of the rotor vanes over the stator pockets. It has been found that improved performance and reduction of destructive vibration forces, through the reduction of turbulence produced particularly at the hub during the transition of the brake liquid from the rotor to the stator and vice-versa, can be effected by "clipping" the vanes adjacent the hub or inner margin of the rotor. Fig. 39 diagrammatically illustrates a rotor 293 having vanes 294 and a stator 295 having vanes 296. The rotor 293 has a vortex control ring 297 mounted therein and the stator 295 is provided with a similar control ring 298. The vanes 294 are clipped back on an angle of about 16° from the inner face of the rotor, in the region thereof between the ring 297 and the inner margin of the rotor 293. Turbulence at the outer portion of the stator pockets can also be reduced by similarly clipping the stator vanes 296 on an angle of 16° in the region thereof between the ring 298 and the outer margin of the stator 295.

Fig. 40 diagrammatically illustrates a rotor 299 similar to the rotor 293 but having rotor vanes 300 arranged therein and clipped back on an angle of 45° between a vortex control ring 301 and the inner margin of the rotor shell. A stator 302 has vanes 303 mounted therein together with a vortex control ring 304.

It will be understood that each of the rotor vanes may be clipped, or alternate vanes may be clipped, depending upon the number of vanes contained in the rotor and this would also apply to the clipping of the stator vanes. It will also be apparent that the vanes may be clipped on any angle lying between 16° and 45° with beneficial results.

Sharpening of the rotor and stator vanes at their straight edges is also helpful from a performance and vibration standpoint, in that such sharpening reduces the turbulence as the brake liquid passes from the rotor to the stator, and vice-versa. It is preferred to sharpen the vanes on their "in" or lee side as diagrammatically illustrated in Fig. 41. In this figure, a fragment of a rotor vane 305 is shown disposed on an angle of 45° to a vertical plane perpendicular to the axis of rotation, and its edge is beveled on an angle of 25° relative to said plane, on the lee side of the vane.

Comparative tests of hydrodynamic brake units having rotor and stator vane constructions such as diagrammatically illustrated in Figs. 32 to 38, but where the working circuit had the general diametrical dimensions indicated in Fig. 20, have provided very interesting results which are indicated in the logarithmic graph constituting Fig. 42. In this graph the R. P. M. of the rotor is plotted as the abscissa and the horsepower developed as the ordinate.

In Fig. 42, curve A indicates performance obtained with a unit such as illustrated in Fig. 32 wherein both the rotor and stator are truly semi-circular in cross-section and have 90° vanes arranged therein. Curve B indicates the results obtained with a unit such as diagrammatically shown in Fig. 33 in which both the rotor and stator have 90° vanes and wherein the axial width of the vanes is 1½ times the radius of the rotor and stator shells minus ⅜₁₆ inch. Curve C indicates the performance of a unit such as diagrammatically illustrated in Fig. 34 wherein both the rotor and stator have 90° vanes and the axial width of the vanes is 1½ times the radius of the rotor and stator, or ⅜₁₆ inch greater than that of the unit shown in Fig. 33. It will be apparent from a comparison of curves B and C that the increase in width of the vanes and the consequent lengthening of the brake liquid flow path reduced the power absorption capacity for any given speed. Curve D represents the performance of a unit such as diagrammatically illustrated in Fig. 35, wherein the rotor and stator have 90° vanes but in which the cross-section of the rotor is truly circular and the axial width of the vanes of the stator is 1½ times the radius of the stator. Curve D indicates that improved performance was obtained upon decreasing the circulation path in the rotor 277, compared with curve C and the wide circulation path in the rotor 273 of Fig. 34. Curve A clearly indicates that maximum power absorption can be obtained with 90° vanes and toruses which are truly semi-circular.

By way of comparison, curves E, F, and G indicate the remarkably improved performance obtained with units, such as illustrated in Figs. 36, 37, and 38, respectively, having vanes disposed at an angle of 45° to the axis of rotation. Thus, curve E represents the performance of a unit such as shown in Fig. 36 having vanes truly semi-circular in contour and a rotor and stator having a non-circular cross-section fitting such vanes with the vanes set at an angle of 45°. A comparison of curve E and curve A, which represents the best performance obtained with a unit having 90° vanes of the same size, indicates that the power absorption capacity of the unit shown in Fig. 36 is very much greater than that of the unit shown in Fig. 32. Curve F indicates substantial improved performance over that of curve E obtained with a unit such as diagrammatically shown in Fig. 37, wherein the rotor 285 differs from the rotor 281 shown in Fig. 36 in that it is truly semi-circular in cross-section and has a substantially longer vortex flow path due to the increased depth of the rotor pockets. Curve G indicates the best performance and was obtained with a unit such as diagrammatically illustrated in Fig. 38 wherein both the rotor 289 and stator 291 are semi-circular in cross-section and the vanes in each are disposed on an angle of 45° to the axis of rotation. It will be noted from a comparison of curves G and A that a unit such as diagrammatically illustrated in Fig. 38 has a capacity almost ten times that of the unit shown in Fig. 32, at a speed of 1000 R. P. M. Thus, at 1000 R. P. M., curve A indicates 8 H. P. was developed; whereas, at the same R. P. M., curve G indicates 70 H. P. was developed. Hence, a unit having a rotor and stator of truly semi-circular cross-section and 45° vanes would appear to constitute the most desirable construction.

The great increase in power absorption capacity of the 45° vane units in general is believed to be due to the great increase in vortex velocity provided by the angularly disposed pockets. The very high power absorption capacity represented by curve G is believed to be due to a combination of 45° vanes and pockets of semi-circular cross-section which increased the length of the flow path over the units of Figs. 36 and 37 whose performance is represented by curves E and F, respectively. The improved results are contrary to what might have been expected in view of the decrease in power absorption capacity resulting from increasing the length of the flow path from that of the unit of Fig. 32 to that of Figs. 33, 34 and 35 and whose progressive decrease in power absorption capacity is represented by curves B, D and C.

It will be understood that the principles of construction and design disclosed herein in connection with the shape of the vanes and shells, their angular disposition in the shells, etc., in connection with hydro-kinetic brake or power absorption devices, are equally applicable to hydro-kinetic power transmission devices, such as fluid couplings and torque converters.

It will also be understood that various changes in the details of construction and in the arrangement of the elements of the devices described herein may be made without departing from the principles of the invention or the scope of the annexed claims.

I claim:

1. In a hydro-kinetic device, a substantially semi-toroidal sheet metal shell member having a predetermined number of circumferentially spaced notches in the inner and outer marginal edges thereof and a like number of slots in an intermediate portion thereof, said notches and slots being formed on an angle of about 45° to a plane parallel with and passing through the axis of said shell member, and vanes mounted in said shell member with each vane having peripheral tabs extending into one of the notches formed in said inner and outer marginal edges of said shell and into one of said slots, whereby said vanes are disposed in said shell member upon an angle corresponding to that upon which said notches and slots are formed.

2. A hydro-kinetic device, comprising: a generally cylindrical stator housing including vanes having edges lying in substantially the same plane as one end of said housing; a shaft extending into said housing through said stator and having an end disposed beyond said stator; a substantially semi-toroidal vaned rotor fixed to said shaft with its vanes confronting said stator vanes; and a generally hemi-spherical cover attached to said cylindrical stator housing and enclosing said rotor and shaft end.

3. A hydro-kinetic device, comprising: an elongated cylindrical sleeve; a stator housing secured to and extending axially from one end of said cylindrical sleeve; a shaft extending through said sleeve into said stator housing, said sleeve serving as the sole means for supporting said housing in concentric relation to said shaft; means rotatably supporting said sleeve on said shaft; a rotor in said stator housing fixed to said shaft; and a plurality of vanes mounted in said stator housing and in said rotor, respectively, cooperating to form a working circuit for liquid within said stator housing.

4. A hydro-kinetic device, comprising: a shaft; an elongated sleeve rotatably mounted upon said shaft; a housing member carried by one end of said sleeve; a semi-toroidal stator shell disposed in and fixed to said housing member; a plurality of stator vanes mounted in said stator shell; a rotor fixed to said shaft and including a substantially semi-toroidal rotor shell disposed in confronting relation to said stator shell; rotor vanes mounted in said rotor shell; a generally dome-shaped cover enclosing said rotor and including a cylindrical portion disposed in overlapping relation with said housing member; and means securing said cover to said housing member, said housing member having a passage for the admission of brake liquid thereinto and also having a passage for discharge of brake liquid therefrom.

5. A stator, comprising: a torus member having a plurality of vanes disposed therein and dividing the same into a plurality of pockets, said torus member having a discharge port formed therein at the outer end of one of said pockets; and partition means in said one pocket adjacent said outer end cooperable with said port for effecting the discharge of brake liquid through said port when said stator is in use.

6. A vaned stator torus having a plurality of generally semi-circular pockets formed therein, said stator torus having a discharge port extending therethrough adjacent the outer end of one of said pockets; and partition means in said one pocket separating said discharge port from the remainder of said pocket, said stator torus having a return port extending therethrough communicating with said remainder of said pocket.

7. A stator comprising: an annular shell substantially semi-circular in radial cross-section, a plurality of vanes mounted in said shell dividing the interior thereof into a plurality of pockets; a generally semi-circular partition in one of said pockets and having a substantially smaller radius than the radius of said pocket and being disposed in non-concentric relation with said pocket; and a baffle in said pocket obstructing the pocket adjacent the outer end of said partition, said pocket having a discharge opening formed therein radially outwardly of said baffle.

8. A stator, comprising: an annular shell substantially semi-circular in radial cross-section; a plurality of vanes mounted in said shell on an angle of 45° to the axis of said shell dividing the interior thereof into a plurality of pockets; a substantially semi-circular partition disposed in one of said pockets in non-concentric spaced relation therewith; and a baffle plate in said one pocket obstructing the portion of said one pocket adjacent the outer end of said partition, said shell having a discharge opening for brake liquid located radially outwardly of said baffle plate and having a return opening for brake liquid located radially inwardly of said baffle plate.

9. A stator, comprising: an annular shell substantially semi-circular in radial cross-section; a plurality of vanes mounted in said shell on an angle of 45° to the axis of said shell dividing the interior thereof into a plurality of pockets; a substantially semi-circular partition disposed in one of said pockets in non-concentric spaced relation therewith; a baffle plate in said one pocket obstructing the portion of said one pocket adjacent the outer end of said partition, said stator having a discharge opening for brake liquid located radially outwardly of said baffle plate and having a return opening for brake liquid located radially inwardly of said baffle plate, a second partition similar to said first-mentioned partition located in a second pocket diametrically opposite said first-mentioned pocket and a baffle plate in said second pocket adjacent the outer end of said second partition, said last-mentioned baffle plate having an orifice of predetermined size formed therein to provide a restriction to flow of brake liquid approximately equal to that offered by said one pocket.

10. A laminated vane for use in hydro-kinetic apparatus, comprising: a pair of elongated, flat end plates of predetermined edge contour; a pair of core pieces between said plates having a marginal edge contour corresponding to that of said plates so that the edges thereof are flush with the edges of said plates, said core pieces having their adjacent ends disposed transversely of said end plates and spaced apart longitudinally of said end plates to provide a transverse passage extending through the vane.

11. A hydro-kinetic brake, comprising: a stator housing; a shaft extending into said housing; a rotor in said housing secured to said shaft; vanes on said stator housing and said rotor, respectively, providing confronting pockets forming a working circuit for brake liquid, said stator having radially spaced discharge and return ports both communicating with one of said stator pockets; and partition means in said one stator pocket separating said ports.

12. A hydro-kinetic brake, comprising: a housing; a semi-toroidal stator shell fixed to said housing; a shaft extending into said housing and through said stator shell; a rotor in said housing secured to said shaft; vanes on said stator shell and said rotor, respectively, providing confronting pockets forming a working circuit for brake liquid, said stator shell having a discharge port communicating with the outer portion of one of its pockets and having a return port communicating with one of its pockets at a region closer to said shaft than said first-mentioned port.

13. A hydro-kinetic brake as defined in claim 12, in which the housing has a port in registration with the discharge and return ports, respectively, of the stator shell.

14. A hydro-kinetic brake, comprising: a stator housing; a shaft extending into said housing; a rotor in said housing mounted on said shaft; vanes on said stator housing and said rotor, respectively, providing confronting pockets forming a working circuit for brake liquid, said housing having a discharge port communicating with the outer portion of one of said stator pockets and a return port communicating with said pocket at a region disposed radially inwardly of said first-mentioned port; baffle means in said one pocket separating said ports, said stator having a pocket substantially diametrically opposite said one pocket; and baffle means in said diametrically opposite pocket substantially similar to the baffle means in said one pocket.

15. A hydro-kinetic brake as defined in claim 14, in which the baffle means in the diametrically opposite pocket has an orifice providing substantially the same flow resistance to brake liquid as that caused by the ports and baffle means in said one pocket.

16. A hydro-kinetic brake, comprising: a stator housing; a shaft extending into said housing; a rotor in said housing secured to said shaft; vanes on said stator housing and said rotor, respectively, cooperating to provide a working circuit for brake liquid, said stator housing having a supply opening for brake liquid, at least one of the vanes of said stator having a loading passageway communicating at the inner end thereof with said supply opening and communicating with said working circuit at its outer end; and means separate from and exclusive of said supply opening for venting air directly from the working circuit to the atmosphere.

17. A hydro-kinetic brake as defined in claim 16, in which the air venting means comprises an elongated air expansion chamber in the stator housing and a stator air-bleed vane having a passageway arranged to conduct air from the working circuit to said air expansion chamber.

18. A hydro-kinetic brake as defined in claim 16, in which the stator housing has an air-collecting opening and the stator has an air-bleed vane provided with a passageway establishing communication between the working circuit and said air-collecting opening, and conduit means interconnecting the air-collecting opening and the air expansion chamber.

19. A hydro-kinetic brake, comprising: a stator housing; a shaft extending into said housing; a rotor in said housing secured to said shaft; vanes on said stator housing and said rotor, respectively, cooperating to provide a working circuit for brake liquid, said stator housing having a plurality of separate, circumferentially spaced apart air-collecting openings, a plurality of the vanes of said stator having an air-bleed passageway respectively communicating with one of said air-collecting openings at one end thereof and communicating with said working circuit at the other end thereof for bleeding air from said working circuit; and means for venting the air from said air-collecting openings to the atmosphere.

20. A hydro-kinetic brake as defined in claim 19, including conduit means disposed externally of said stator housing interconnecting at least two of the air-collecting openings of the stator.

21. A hydro-kinetic brake, comprising: a stator housing; a shaft extending into said housing; a rotor in said housing connected to said shaft, said stator and rotor providing a working circuit for brake liquid; a heat exchange device surrounding said shaft and disposed adjacent one end of said stator housing; and means establishing intercommunication between said working circuit and heat exchange device for circulation of brake liquid through said heat exchange device for effecting cooling of said brake liquid.

22. A hydro-kinetic brake, comprising: a cylindrical sleeve; a stator housing mounted upon one end of said sleeve; a shaft extending through said sleeve into said housing; a rotor in said housing connected to said shaft, said stator and rotor providing a working circuit for brake liquid; an annular heat exchange device mounted upon said sleeve; and means establishing intercommunication between said working circuit and heat exchange device for effecting cooling of said brake device.

23. A hydro-kinetic brake, comprising: a stator housing adapted to contain brake liquid; a shaft extending into said housing; a rotor in said housing fixed to said shaft; an annular heat exchanger arranged substantially concentric with the axis of said shaft, said housing having a discharge port and said heat exchanger having an inlet port in registration therewith for admitting brake liquid from said housing into said heat exchanger, said heat exchanger also having a discharge port and said housing having a return port in registration therewith for returning cooled brake liquid from said heat exchanger to said housing.

24. A hydro-kinetic brake, comprising: a housing including an end member; a stator shell within said housing carried by said end member; a rotor in said housing; means for introducing brake liquid into and for removing brake liquid from said housing; and a heat exchanger for cooling said brake liquid disposed co-axially with said housing, said stator shell, housing end member and said heat exchanger having registering discharge and return ports for circulation of brake liquid from said housing through said heat exchanger and for return to said housing.

25. A hydro-kinetic brake, comprising: a stator housing for brake liquid, said housing having a substantial flat end wall; an annular heat exchanger abutting said flat end wall of said housing, said annular heat exchanger being disposed substantially concentric with said housing and including a pair of end members, a header plate adjacent one of said end members, an inner cylindrical casing member, an outer cylindrical casing member and a hollow, generally spiral heat exchange element disposed in the space between said end members and casing members, said housing end wall and one of said end members each being provided with registering ports for the flow of brake liquid from said housing into said heat exchanger for contact with the exterior of said spiral heat exchange element and also having registering ports for the return of brake liquid from said heat exchanger to said housing, said other end member and said header plate having registering inlet ports communicating with the interior of said heat exchange element at one end thereof for admitting cooling liquid thereinto and having registering outlet ports communicating with the interior of said heat exchange element at the other end thereof for discharging the cooling liquid from said heat exchange element.

26. A hydro-kinetic brake, comprising: a housing including an end member; a stator shell within said housing carried by said end member; a rotor in said housing; means for introducing brake liquid into and for exhausting brake liquid from said housing; a heat exchanger for cooling said brake liquid disposed co-axially with one end thereof adjacent said end member, said stator shell, end member and said heat exchanger having registering discharge and return ports for circulation of brake liquid from said housing through said heat exchanger and for return to said housing; a header member at the opposite end of said heat exchanger, said heat exchanger having a cooling element therein provided with an inlet and an outlet for a coolant, and said header member having an inlet port communicating with the inlet of said cooling element and a discharge port communicating with the outlet of said cooling element.

27. A hydro-kinetic brake, comprising: a housing containing a vaned rotor and a vaned stator providing a working circuit for brake liquid, said stator having at least one vane provided with an air-bleed passage extending therethrough and communicating at its inner end with a low pressure zone of said working circuit; a heat exchanger arranged co-axially with said stator and including a spiral cooling element; and ports in said stator and heat exchanger establishing communication between said working circuit and the ends of the spiral space in said heat exchanger surrounding said spiral cooling element, whereby brake liquid can flow from the working circuit in contact with said cooling element to be cooled and returned to said working circuit, said stator and heat exchanger having air-bleed holes establishing communication between the outer end of said air-bleed passageway in said air-bleed vane and the spaces between the convolutions of said spiral cooling element for preventing air-locking of said heat exchanger.

28. A heat exchange device, comprising: a housing including a pair of annular end members, and inner and outer cylindrical casing members disposed between said end members; a hollow, generally spiral heat exchange element in said housing, one of said end members having inlet and outlet ports communicating with the interior of said heat exchange element at spaced points and other of said end members having spaced inlet and outlet ports communicating with the space in said housing exteriorly of said heat exchange element; and means including an element extending centrally through said end members and clamping said casing members between said end members.

29. A heat exchange device, comprising: a housing including a pair of annular end members, and inner and outer cylindrical casing members disposed between said end chambers; a hollow, generally spiral heat exchange element in said housing, said heat exchange element including a pair of elongated metal strips bonded together at their ends and along their longitudinal edges, one of said end members having inlet and outlet ports communicating with the interior of said heat exchange element at spaced points along one longitudinal edge thereof and the other of said end members having inlet and outlet ports communicating with the space in said housing exteriorly of said heat exchange element; and means including an element extending centrally through said end members and clamping said casing members between said end members.

30. A heat exchange device as defined in claim 29, in which said end members have marginal flanges at the inner and outer peripheries thereof telescoping with said casing members and wherein sealing means is disposed at the longitudinal edges of said heat exchange element to form a seal between said edges of said heat exchange element and said end members and between said flanges and said casing members.

31. A heat exchange device, comprising: a pair of spaced annular channel members disposed with their channels confronting each other; inner and outer shell members disposed between said channel members; a hollow, generally spiral heat exchange element in the space defined by said channel members and shell members, said heat exchange element having its longitudinal edges received in respect of said channel members; and sealing means in said channel members forming a seal with the longitudinal edges of said heat exchange element, one of said channel members having inlet and outlet ports communicating with the interior of said heat exchange element, and the other of said channel members having inlet and outlet ports communicating with the space exteriorly of said heat exchange element.

32. In a hydro-kinetic device, a semi-toroidal sheet metal stator shell member; stator housing means having a concave recess therein engaged by and complemental in shape to at least the outer surface of the deepest portion of said shell member and having a marginal flange terminating short of the outer edge of said stator shell member, said flange portion conforming to and surrounding said stator shell member and being in contact at its edge with the outer marginal surface of said stator shell and a plurality of vanes mounted in said stator shell member.

33. A hydro-kinetic device, comprising: a generally cylindrical stator housing; a vaned stator in said housing having a plurality of semi-toroidal pockets with the open faces of said pockets disposed in about the same plane as one end of said housing; a shaft having one end thereof extending into said housing; a vaned, substantially semi-toroidal rotor shell fixed to said one end of said shaft with the open faces of its pockets confronting the pockets of said stator; and a generally hemi-spherical housing portion mounted upon said stator housing and enclosing said rotor shell and said one end of said shaft.

34. A hydro-kinetic brake, comprising: a stator housing; a shaft extending into said housing; a rotor in said housing connected to said shaft, said stator and rotor providing a working circuit for brake liquid; a heat exchange device abutting one end of said stator housing in co-axial relation thereto; and means establishing intercommunication between said working circuit and heat exchange device for continuous circulation of brake liquid from said working circuit through said heat exchange device and back to said working circuit for effecting cooling of said brake liquid.

35. A hydro-kinetic brake, comprising: a housing including an end member; a vaned stator shell within said housing carried by said end member; a vaned rotor in said housing cooperating with said vaned stator shell to provide a working circuit for brake liquid; means for introducing brake liquid into and for removing brake liquid from said housing; and a heat exchanger for cooling said brake liquid disposed co-axially with and in abutting relation to said housing end member, said stator shell, housing end member, and said heat exchanger having registering discharge and return ports, said ports communicating with said working circuit at zones between the vanes of said stator shell for circulation of brake liquid from said housing through said heat exchanger and for return to said housing.

36. A hydro-kinetic brake, comprising: a cylindrical sleeve; a stator housing mounted upon one end of said sleeve; a shaft extending through said sleeve and into said housing; a rotor in said housing secured to said shaft; vanes on said stator housing and said rotor, respectively, providing confronting pockets forming a working circuit for brake liquid, said stator having radially spaced discharge and return ports both communicating with one of said stator pockets; partition means in said one stator pocket separating said ports; an annular heat exchange device mounted upon said sleeve adjacent said stator housing; and means establishing intercommunication between the discharge and return ports of said one stator pocket and said heat exchange device for effecting cooling of said brake liquid.

37. A hydro-kinetic brake, comprising: a stator housing; a shaft extending into said housing; a rotor in said housing secured to said shaft; vanes on said stator housing and said rotor, respectively, providing confronting pocket means forming a working circuit for brake liquid, said stator housing having spaced discharge and return ports both opening into the pocket means thereof from one end of said stator housing; a heat exchanger arranged substantially concentric with the axis of said shaft and adjacent said one end of said stator housing, said heat exchanger having an inlet port in registration with the discharge port of said stator housing for admitting brake liquid from said stator housing into said heat exchanger, said heat exchanger also having a discharge port in registration with the return port of said stator housing for returning cooled brake liquid from said heat exchanger to said stator housing; and means securing said stator housing and heat exchanger in assembled relation.

38. A hydro-kinetic brake, comprising: a housing; a semi-toroidal stator shell fixed to said housing; a shaft extending into said housing and through said stator shell; a rotor in said housing secured to said shaft; vanes on said stator shell and said rotor, respectively, providing confronting pockets forming a working circuit for brake liquid, said stator shell having a discharge port communicating with the outer portion of one of its pockets and having a return port communicating with one of its pockets at a region closer to said shaft than said first-mentioned port; a heat exchange device adjacent one end of said housing and including a pair of annular end members, inner and outer cylindrical casing members disposed between said end members, and a hollow, generally spiral heat exchange element disposed between said end members and casing members, one of said end members having inlet and outlet ports communicating with the interior of said heat exchange element at spaced points and the other of said end members having spaced apart inlet and outlet ports communicating with the space in said housing exteriorly of said heat exchange element, the discharge and return ports of said stator shell registering with the ports of one of said end members; and means securing said housing and heat exchanger in assembled relation.

39. A hydro-kinetic brake, comprising: a vaned stator torus having a plurality of generally semi-circular pockets formed therein, said stator torus having a discharge port extending therethrough adjacent the outer end of one of said pockets; and partition means in said one pocket separating said discharge port from the remainder of said pocket, said stator torus having a return port extending therethrough communicating with said remainder of said pocket; a shaft; a vaned rotor torus mounted on said shaft and having pockets confronting said stator pockets; an annular heat exchanger arranged substantially concentric with the axis of said shaft, said heat exchanger having a discharge port in registration with said return port of said stator torus for returning cooled brake liquid from said heat exchanger to said stator torus, said heat exchanger also having a return port in registration with said discharge port of said stator torus for admitting brake liquid into said heat exchanger to be cooled; and means mounting said heat exchanger in operative relation to said stator torus.

40. A hydro-kinetic brake, comprising: a housing including an end member; a stator shell within said housing carried by said end member; a rotor in said housing cooperating with said stator shell to provide a working circuit for brake liquid; means for introducing brake liquid into and for removing brake liquid from said housing; and a heat exchanger for cooling said brake liquid disposed co-axially with and in abutting relation to said housing end member, said heat exchanger comprising a pair of spaced annular channel members disposed with their channels confronting each other and with one of said channel members adjacent said housing end member; inner and outer shell members disposed between said channel members; a hollow generally spiral heat exchange element in the space defined by said channel members and shell members, said heat exchange element having its longitudinal edges received in respective of said channel members, and sealing means in said channel members forming a seal with the longitudinal edges of said heat exchange element, said one channel member having inlet and outlet ports and said stator shell and housing end member having ports registering therewith for establishing communication between said housing and the space exteriorly of said heat exchange element, and the other of said channel members having inlet and outlet ports for a coolant communicating with the interior of said heat exchange element.

41. A chassis dynamometer, comprising: a pair of rolls; frame means including bearings rotatably supporting said rolls; a hydro-kinetic brake unit having a stator housing of a diameter substantially equal to the diameter of one of said rolls; a shaft having one end thereof extending into and terminating within said stator housing; a semi-toroidal rotor shell in said housing mounted on the extremity of said one end of said shaft, said stator housing including an imperforate, generally hemispherical wall portion enclosing said rotor and said one end of said shaft; and means directly connecting the other end of said shaft to said one roll so that said brake unit is axially aligned with and supported by said one roll.

42. In a chassis dynamometer, a drive roll; a stub shaft constituting an axial extension of one end of said drive roll; a hydro-kinetic brake unit including a housing mounted upon said shaft for rotary movement relative thereto, said shaft extending through one end of said housing and terminating within said housing; a rotor in said housing fixed to said shaft at the extremity thereof, said rotor and housing having confronting vanes providing a working circuit for brake liquid, said stator housing including an imperforate generally hemispherical wall portion enclosing said rotor and said extremity of said shaft; and means rotatably supporting said drive roll including a bearing supporting said shaft at a point intermediate said housing and the adjacent end of said drive roll, whereby said shaft serves as a cantilever providing the sole support for said brake unit.

43. In a hydro-kinetic device, a brake housing including a generally semi-toroidal sheet metal stator shell member and an annular housing plate, said plate being substantially flat on one side thereof throughout its entire area for abutting engagement by a heating exchanger and having a concave recess in its other side complemental in shape to the outer surface of at least the deepest portion of said shell member; a plurality of vanes mounted in said shell member, said vanes, shell member, and housing plate being permanently bonded together; and a heat exchanger engaging said flat area of said housing plate, said shell member, housing plate, and heat exchanger having registering passageways at a location lying between certain of said vanes for interflow of brake liquid between said brake housing and said heat exchanger.

References Cited in the file of this patent

UNITED STATES PATENTS

| | | |
|---|---|---|
| 1,822,555 | Weiss | Sept. 8, 1931 |
| 1,873,688 | Walker | Aug. 23, 1932 |
| 2,113,109 | De La Mater | Apr. 5, 1938 |
| 2,129,300 | Bichowsky | Sept. 6, 1938 |
| 2,189,189 | Bennett | Feb. 6, 1940 |
| 2,206,859 | Duffield | July 2, 1940 |
| 2,251,066 | Persson et al. | July 29, 1941 |
| 2,267,852 | Walker | Dec. 20, 1941 |
| 2,281,168 | Paget | Apr. 28, 1942 |
| 2,287,084 | Bennett | June 23, 1942 |
| 2,304,721 | Werther | Dec. 8, 1942 |
| 2,341,122 | Schmidt | Feb. 8, 1944 |
| 2,358,469 | Neracker | Sept. 19, 1944 |
| 2,381,187 | Swift | Aug. 7, 1945 |
| 2,429,989 | Buckendale | Nov. 4, 1947 |
| 2,539,004 | Becker | Jan. 23, 1951 |
| 2,598,620 | Swift | May 27, 1952 |
| 2,632,397 | Jandasek | Mar. 24, 1953 |
| 2,663,549 | Otten | Dec. 22, 1953 |
| 2,768,711 | Cline | Oct. 30, 1956 |

FOREIGN PATENTS

| | | |
|---|---|---|
| 10,482 | Great Britain | of 1887 |
| 15,695 | Great Britain | July 6, 1911 |